US008032903B2

(12) United States Patent
Takaki et al.

(10) Patent No.: US 8,032,903 B2
(45) Date of Patent: Oct. 4, 2011

(54) MOTOR WITH A CHUCKING DEVICE FOR DETACHABLY HOLDING A DISK AND DISK DRIVE APPARATUS EQUIPPED WITH THE SAME

(75) Inventors: Hitoshi Takaki, Kyoto (JP); Yusuke Iwai, Kyoto (JP); Satoru Kuramoto, Kyoto (JP); Tatsuya Tatara, Kyoto (JP)

(73) Assignee: Nidec Corporation, Kyoto (JP)

( * ) Notice: Subject to any disclaimer, the term of this patent is extended or adjusted under 35 U.S.C. 154(b) by 868 days.

(21) Appl. No.: 12/051,313

(22) Filed: Mar. 19, 2008

(65) Prior Publication Data
US 2008/0235718 A1 Sep. 25, 2008

(30) Foreign Application Priority Data

Mar. 19, 2007 (JP) ................................. 2007-070649

(51) Int. Cl.
*G11B 17/028* (2006.01)
(52) U.S. Cl. ....................................... 720/709; 720/707
(58) Field of Classification Search .................. 720/706, 720/707, 709, 704, 705
See application file for complete search history.

(56) References Cited

U.S. PATENT DOCUMENTS

| 4,613,968 A | 9/1986 | Okita |
|---|---|---|
| 5,001,700 A | 3/1991 | Rowden et al. |
| 5,166,920 A | 11/1992 | Kogure |
| 5,323,379 A | 6/1994 | Kim |
| 5,426,548 A | 6/1995 | Fujii et al. |
| 5,623,382 A | 4/1997 | Moritan et al. |
| 5,774,445 A | 6/1998 | Sawi et al. |
| 5,799,006 A | 8/1998 | Mukawa |
| 6,041,033 A | 3/2000 | Otsubo et al. |
| 6,208,613 B1 | 3/2001 | Iizuka |
| 6,222,818 B1 | 4/2001 | Kobayashi et al. |
| 6,249,506 B1 | 6/2001 | Oowaki et al. |
| 6,363,048 B1 | 3/2002 | Wu et al. |

(Continued)

FOREIGN PATENT DOCUMENTS

CN  1412758 A  4/2003

(Continued)

OTHER PUBLICATIONS

Chinese Office Action dated Aug. 21, 2009, issued in Chinese Patent Application No. 200810087511.6.

*Primary Examiner* — Brian Miller
(74) *Attorney, Agent, or Firm* — Westerman, Hattori, Daniels & Adrian, LLP

(57) ABSTRACT

In a motor including a chucking device for detachably holding a disk, the chucking device has a center case to which a central opening of the disk is inserted; resilient members received within the center case; and claw members for holding the disk in place. Each of the claw members has a tip end portion, a disk holding surface positioned axially below the tip end portion for holding the disk in place, and a recessed sliding portion formed substantially at a circumferential center region of the disk holding surface, the sliding portion serving to guide movement of the claw member. Rest portions are formed in the center case in a facing relationship with the respective sliding portions, the rest portions serving to support the respective sliding portions by contacting therewith. Each of the rest portions has an upwardly convex curved surface with which the corresponding sliding portion makes contact.

9 Claims, 16 Drawing Sheets

U.S. PATENT DOCUMENTS

| | | | |
|---|---|---|---|
| 6,611,490 B1 | 8/2003 | Bierhoff | |
| 6,756,711 B2 | 6/2004 | Matsuyama et al. | |
| 6,757,238 B2 | 6/2004 | Higuchi | |
| 6,826,771 B1 | 11/2004 | Wada | |
| 6,832,384 B2 | 12/2004 | Yamaguchi | |
| 6,868,549 B2 | 3/2005 | Watanabe et al. | |
| 6,871,352 B2 | 3/2005 | Kurosaka et al. | |
| 6,957,443 B2 | 10/2005 | Horng et al. | |
| 7,181,752 B2 | 2/2007 | Shinkai et al. | |
| 7,987,475 B2 | 11/2007 | Takaki et al. | |
| 7,360,227 B2 | 4/2008 | Iwai | |
| 7,493,633 B2 | 2/2009 | Ikemoto | |
| 7,538,459 B2 | 5/2009 | Ichizaki | |
| 7,540,005 B2 | 5/2009 | Toyokawa et al. | |
| 7,581,235 B2 | 8/2009 | Oota | |
| 7,802,272 B2 | 9/2010 | Kanzawa et al. | |
| 7,856,642 B2 | 12/2010 | Takaki et al. | |
| 7,877,764 B2 * | 1/2011 | Takaki et al. | 720/707 |
| 7,890,969 B2 * | 2/2011 | Takaki et al. | 720/707 |
| 7,900,223 B2 * | 3/2011 | Takaki et al. | 720/707 |
| 7,908,614 B2 * | 3/2011 | Takaki et al. | 720/707 |
| 7,921,438 B2 * | 4/2011 | Takaki et al. | 720/707 |
| 7,937,722 B2 * | 5/2011 | Takaki et al. | 720/707 |
| 2002/0079758 A1 | 6/2002 | Matsuyama et al. | |
| 2003/0107984 A1 | 6/2003 | Yamaguchi | |
| 2004/0205803 A1 | 10/2004 | Horng et al. | |
| 2004/0256926 A1 | 12/2004 | Miyamoto | |
| 2006/0048176 A1 | 3/2006 | Choi et al. | |
| 2007/0157219 A1 | 7/2007 | Oota | |
| 2007/0192779 A1 | 8/2007 | Oota | |
| 2007/0192780 A1 | 8/2007 | Oota | |
| 2007/0199008 A1 | 8/2007 | Oota | |
| 2007/0278880 A1 | 12/2007 | Wada et al. | |
| 2007/0300247 A1 | 12/2007 | Kim et al. | |
| 2008/0002288 A1 | 1/2008 | Takaki et al. | |
| 2008/0046904 A1 | 2/2008 | Takaki et al. | |
| 2008/0046905 A1 | 2/2008 | Takaki et al. | |
| 2008/0120633 A1 * | 5/2008 | Takaki et al. | 720/707 |
| 2008/0235717 A1 * | 9/2008 | Takaki et al. | 720/604 |
| 2008/0235720 A1 * | 9/2008 | Takaki et al. | 720/704 |
| 2009/0241140 A1 | 9/2009 | Takaki et al. | |

FOREIGN PATENT DOCUMENTS

| | | |
|---|---|---|
| JP | 10-080119 A | 3/1998 |
| JP | 11-055900 A | 2/1999 |
| JP | 11-073722 A | 3/1999 |
| JP | 11-262214 A | 9/1999 |
| JP | 2000-166170 A | 6/2000 |
| JP | 2001-286113 A | 10/2001 |
| JP | 2001-339896 A | 12/2001 |
| JP | 2002-176742 A | 6/2002 |
| JP | 2002-190149 A | 7/2002 |
| JP | 2003-045105 A | 2/2003 |
| JP | 2005-251298 A | 9/2005 |
| JP | 2005-251299 A | 9/2005 |
| JP | 2005-251300 A | 9/2005 |
| JP | 2005-251301 A | 9/2005 |
| JP | 2005-251302 A | 9/2005 |
| JP | 2005-251303 A | 9/2005 |
| JP | 2005-251304 A | 9/2005 |
| JP | 2005-251305 A | 9/2005 |
| JP | 2005-251306 A | 9/2005 |
| JP | 2005-253239 A | 9/2005 |
| JP | 2005-354757 A | 12/2005 |
| JP | 2006-048821 A | 2/2006 |
| JP | 2008-010071 A | 1/2008 |
| KR | 1020050095085 A | 9/2005 |

* cited by examiner

MOTOR WITH A CHUCKING DEVICE FOR DETACHABLY HOLDING A DISK AND DISK DRIVE APPARATUS EQUIPPED WITH THE SAME

FIELD OF THE INVENTION

The present invention relates to a motor provided with a chucking device for removably holding a disk and a disk drive apparatus equipped with the motor; and, more particularly, to a technique of increasing a disk holding force of a chucking device and reducing a disk mounting force.

BACKGROUND OF THE INVENTION

A chucking device has heretofore been developed as a device for removably holding an optical disk such as a compact disk or the like (hereinafter simply referred to as a "disk"). In general, the chucking device is attached to a top portion of a motor and is rotated together with the motor to thereby rotate the disk.

In keeping with a recent demand for a low-profile disk drive apparatus, it becomes essential to reduce the thickness of a motor provided with a chucking device. In this type of motor, the thickness of the chucking device accounts for a large percentage of the overall thickness of the motor. Therefore, reduction in thickness of the chucking device is very effective in providing a low-profile disk drive apparatus.

A conventional chucking device that realizes thickness reduction is disclosed in Japanese Patent Laid-open Publication No. 2005-251298 (JP2005-251298A). The chucking device includes claw members for holding a disk. Each of the claw members has a disk holding surface that makes contact with the disk and a pair of downwardly extending guide surfaces formed on the opposite circumferential sides of the disk holding surface for guiding radial inward movement of each of the claw members.

Along with the increase in a quantity of information stored in a disk, it is a recent trend that a laminated disk, such as a DVD or the like, formed by bonding two disks together is frequently used in recent years. Since the laminated disk has an increased thickness, a low-profile chucking device is incapable of exerting a disk holding force (hereinafter referred to as a "holding force") great enough to hold the laminated disk. Particularly, in case of the claw members disclosed in JP2005-251298A, it is difficult to increase a circumferential width of the disk holding surface because the downwardly extending guide surfaces are formed on the opposite sides of the disk holding surface. This means that the chucking device disclosed in JP2005-251298A is unable to exert a holding force great enough to hold a disk having an increased thickness.

It would be thinkable that the spring force of a coil spring is increased to obtain the holding force as required. If the spring force is increased, however, it becomes hard for the claw members to move in a radial inward direction when the disk is mounted to the chucking device. This poses a problem in that the disk mounting force is increased.

In keeping with the thickness reduction of a disk drive apparatus, the moving distance of a disk required in traversing a motor becomes small. This reduces the force by which the disk is mounted to a chucking device. Therefore, it is necessary for the chucking device to have a structure that allows the disk to be mounted with ease.

SUMMARY OF THE INVENTION

The present invention provides a motor provided with a chucking device that makes it possible to mount a disk with ease and can exert a holding force great enough to hold a disk with an increased thickness such as a laminated disk or the like, and a disk drive apparatus equipped with the motor.

In accordance with an aspect of the present invention, there is provided a motor including: a chucking device for detachably holding a disk having a central opening portion; a rotating body rotatable about a specified center axis, the rotating body including a rotor magnet and a rotor holder, the rotor holder having a cylindrical portion for holding the rotor magnet in place, a cover portion extending from the cylindrical portion to the center axis and a disk support portion formed on an upper surface of the cover portion for making contact with a lower surface of the disk; and a fixed body including a bearing member for rotatably supporting the rotating body and a stator arranged to face the rotor magnet, wherein the chucking device includes: a center case to which the central opening portion of the disk is inserted, the center case having a cylindrical portion coaxial with the center axis and a cover portion for covering an axial upper side of the cylindrical portion of the center case, at least a part of the cylindrical portion of the center case arranged axially above the rotating body; resilient members received within the center case; and claw members for holding the disk in place, the claw members remaining in contact with radial outer ends of the respective resilient members, wherein each of the claw members has a tip end portion, a disk holding surface positioned axially below the tip end portion for holding the disk in place, and a recessed sliding portion formed substantially at a circumferential center region of the disk holding surface, the sliding portion serving to guide movement of the claw member, wherein rest portions are formed in the center case in a facing relationship with the respective sliding portions, the rest portions serving to support the respective sliding portions by contacting therewith, wherein the sliding portions are designed to make contact with the respective rest portions when the disk is mounted to the chucking device, wherein each of the sliding portions has a substantially planar slanting surface inclined radially inwardly and axially downwardly, and wherein each of the rest portions has an upwardly convex curved surface with which the corresponding sliding portion makes contact.

With such configurations, since the sliding portion has the substantially planar slanting surface inclined radially inwardly and axially downwardly and the rest portion has the upwardly convex curved surface, the sliding portion makes line-to-line or point-to-point contact with the rest portion. Accordingly, it is possible to reduce the frictional force that acts between the sliding portion and the rest portion when the sliding portion moves radially inwardly. As a result, the sliding portion can smoothly move radially inwardly, which reduces the force required in mounting the disk to the chucking device.

Preferably, the rest portion has a circumferential width smaller than that of the sliding portion of the claw member.

With such configuration, since the rest portion has a circumferential width smaller than that of the sliding portion of the claw member, the rest portion is prevented from contacting with other portions than the sliding portion of the claw member. Accordingly, the movement of the claw member is made stable. Further, it is possible to prevent an increase in force required in mounting the disk to the chucking device due to the increase in the frictional force caused by the contact of the sliding portion with the rest portion.

Preferably, the rest portion further has a slanting surface inclined radially inwardly and axially downwardly, the slanting surface being connected to the upwardly convex curved surface; and the slanting surface of the rest portion and a radial plane make an acute angle greater than an acute angle made by the sliding portion and the radial plane.

With such configurations, since the slanting surface of the rest portion and the radial plane make an acute angle greater than an acute angle made by the sliding portion and the radial plane, it is possible to prevent the sliding portion from contacting with the slanting surface of the rest portion. Accordingly, the sliding portion can more smoothly move radially inwardly.

Connecting portions may be provided on opposite circumferential sides of each of the rest portions, the connecting portions connecting the corresponding rest portion to the cylindrical portion, and each of the connecting portions may have an upper slanting surface inclined radially inwardly and axially downwardly, which faces the disk holding surface.

With such configurations, since the connecting portion has the upper slanting surface inclined radially inwardly and axially downwardly, it is possible to increase the axial thickness of the connecting portion to thereby improve the strength of the connecting portion.

Preferably, the upper slanting surface of the connecting portion and the radial plane makes an acute angle smaller than an acute angle made by the disk holding surface and the radial plane.

With such configurations, it is possible to increase the axial height of the inner edge of the connecting portion to thereby improve the strength of the connecting portion.

Preferably, the claw member further has a claw-side stopper of a substantially planar shape provided below the sliding portion, the claw-side stopper serving to restrict a radial outward movement of the claw member by contacting with an inner surface of the corresponding rest portion, and the inner surface of the rest portion with which the claw-side stopper makes contact has a planar portion parallel to the claw-side stopper.

With such configurations, even though the claw-side stopper repeatedly makes contact with the inner surface of the rest portion, the strength of the rest portion is increased by the connecting portions so that deformation of the rest portion can be suppressed.

Further, slanting portions may be formed on opposite circumferential sides of the claw-side stopper, the slanting portion being inclined radially inwardly as they go away circumferentially from the claw-side stopper, and the claw-side stopper has a circumferential width equal to or smaller than a circumferential width of the planar portion of the rest portion.

With such configurations, since the claw-side stopper makes contact with only the planar portion of the rest portion, it is possible to prevent the tip end portion of the claw member from being deviated circumferentially in the state that the claim-side stopper is in contact with the rest portion.

Preferably, the inner surfaces of the rest portion and the connecting portions are located radially outwardly of the inner surface of the cylindrical portion.

With such configurations, the radial moving distance of the claw member can be increased. Accordingly, it is possible to improve the design flexibility in respect of the radial movement of the claw member.

In accordance with another aspect of the present invention, there is provided a disk drive apparatus equipped with the aforementioned motor, including: an optical pickup mechanism for optically recording and reproducing information on and from the disk; a moving mechanism for moving the optical pickup mechanism in a radial direction of the disk; and a chassis to which the motor is attached, the chassis having an opening, the optical pickup mechanism arranged inside the opening.

With such configurations, it is possible to provide a highly reliable low-profile disk drive apparatus.

In accordance with the present invention, it is possible to provide a motor provided with a chucking device that makes it possible to mount a disk with ease and can exert a holding force great enough to hold a disk with an increased thickness such as a laminated disk or the like, and a disk drive apparatus equipped with the motor.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

<Overall Structure of a Motor>

One embodiment of a motor in accordance with an embodiment of the present invention will now be described with reference to FIG. 1, which shows an axially-cut schematic section view of a motor.

Figure 1:
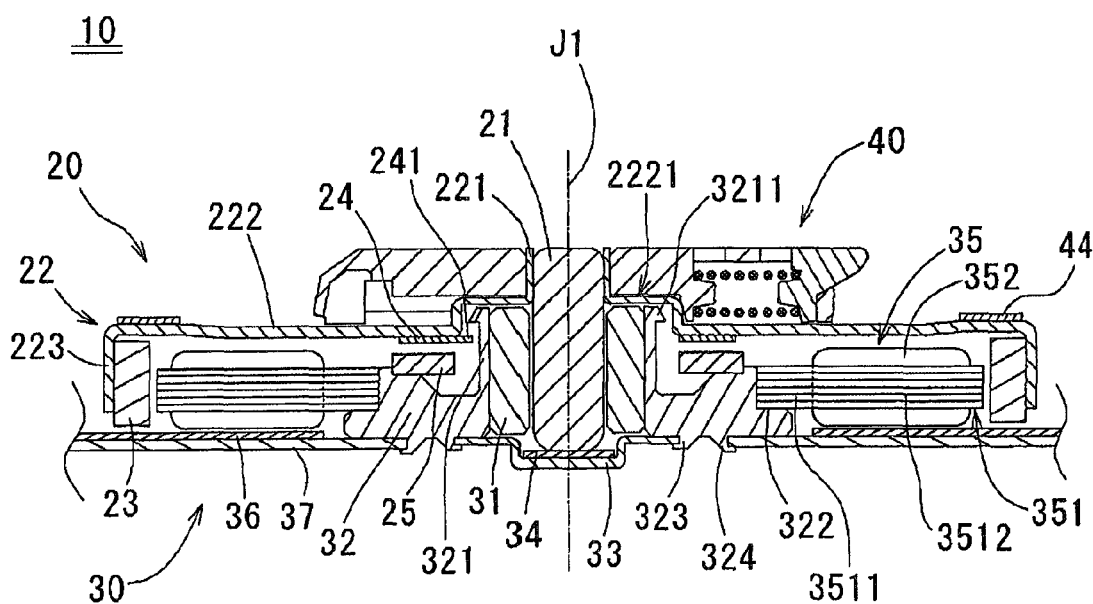
FIG. 1 is an axially-cut schematic section view showing a motor in accordance with one embodiment of the present invention.

Referring to FIG. 1, a motor 10 of the present embodiment includes a rotating body 20 designed to rotate about a specified center axis J1, a fixed body 30 for rotatably supporting the rotating body 20 and a chucking device 40 arranged on an axial top side of the rotating body 20 for removably holding a disk (not shown).

First, description will be made regarding the rotating body 20.

The rotating body 20 includes a generally columnar shaft 21 arranged in a coaxial relationship with the center axis J1, a rotor holder 22 fixed to an upper portion of the shaft 21 and an annular rotor magnet 23 fixedly secured to the rotor holder 22.

The rotor holder 22 is produced by press-forming a thin magnetic metal plate. The rotor holder 22 includes a cylindrical shaft-fixed portion 221 having an inner circumferential surface fixed to an outer circumferential surface of the shaft 21, a cover portion 222 extending radially outwardly from the shaft-fixed portion 221 and a cylindrical portion 223 extending axially downwardly from an outer circumferential edge of the cover portion 222. The rotor magnet 23 is bonded to an inner circumferential surface of the cylindrical portion 223 by means of an adhesive agent.

An axially upwardly recessed central protrusion portion 2221 is formed in a center region of the cover portion 222 in a generally coaxial relationship with the center axis J1. A removal-proof member 24 having a plurality of radially inwardly extending lugs 241 (three lugs in the present embodiment) is fixed to the underside of the cover portion 222 that extends radially outwardly from the lower end of the central protrusion portion 2221.

Next, description will be made regarding the fixed body 30.

The fixed body 30 includes a sleeve 31 for rotatably supporting the shaft 21 radially, a bearing bush 32 with a bore for holding the sleeve 31 in place, a cover plate 33 for covering an axial lower end of the bore of the bearing bush 32, a thrust plate 34 arranged on a top surface of the cover plate 33 for rotatably supporting the shaft 21 in an axial direction by making contact with a lower end surface of the shaft 21, a stator 35 fixed to the outside of the bearing bush 32, a circuit board 36 arranged below the stator 35 and an attachment plate 37 fixed to the bearing bush 32, the attachment plate 37 having an upper surface kept in contact with a lower surface of the circuit board 36.

The sleeve 31 is made of an oil-containing sintered metal and is formed into a generally cylindrical shape so that it can have an inner circumferential surface which serves as a shaft rest surface for supporting an outer circumferential surface of the shaft 21. The sleeve 31 has an outer circumferential surface fixed to an inner circumferential surface of the bearing bush 32.

The bearing bush 32 has a cylindrical portion 321 for holding the sleeve 31 in place and a stator-fixing portion 322 extending radially outwardly from the cylindrical portion 321 to hold the stator 35 in place. On a lower surface of the bearing bush 32, there are formed an inner protrusion portion 323 for fixing the cover plate 33 by caulking and an outer protrusion portion 324 arranged radially outwardly of the inner protrusion portion 323 for fixing the attachment plate 37 by caulking. A radially outwardly extending hook portion 3211 is formed in a top end of the cylindrical portion 321. In this regard, the lugs 241 of the removal-proof member 24 are positioned on an axial lower side of the hook portion 3211. Each of the lugs 241 has an inner circumferential edge positioned radially inwardly of an outer circumferential edge of the hook portion 3211. This ensures that, even when the rotating body 20 is urged to move axially upwardly, an upper surface of each of the lugs 241 makes contact with a lower surface of the hook portion 3211 to thereby restrict axial upward movement of the rotating body 20.

An annular attracting magnet 25 for axially downwardly attracting the rotor holder 22 is arranged on an upper surface of the bearing bush 32 that remains in an axially facing relationship with the removal-proof member 24.

The stator 35 is fixed to the stator-fixing portion 322 of the bearing bush 32 by means of an adhesive agent. The stator 35 includes a stator core 351 formed of a plurality of axially layered thin magnetic steel plates and a coil 352 formed of a conductive wire wound around the stator core 351. The stator core 351 is constructed from an annular core-back portion 3511 and a plurality of tooth portions 3512 radially outwardly extending from the core-back portion 3511. The coil 352 is formed by winding the conductive wire around the tooth portions 3512 in plural turns.

If an electric current is supplied to the coil 352 from an external power source (not shown), rotating magnetic fields are formed between the coil 352 and the rotor magnet 23. Thus, the rotating body 20 is rotated in a specified circumferential direction by a rotational torque that acts about the center axis J1.

<Structure of the Chucking Device>

Figure 2:
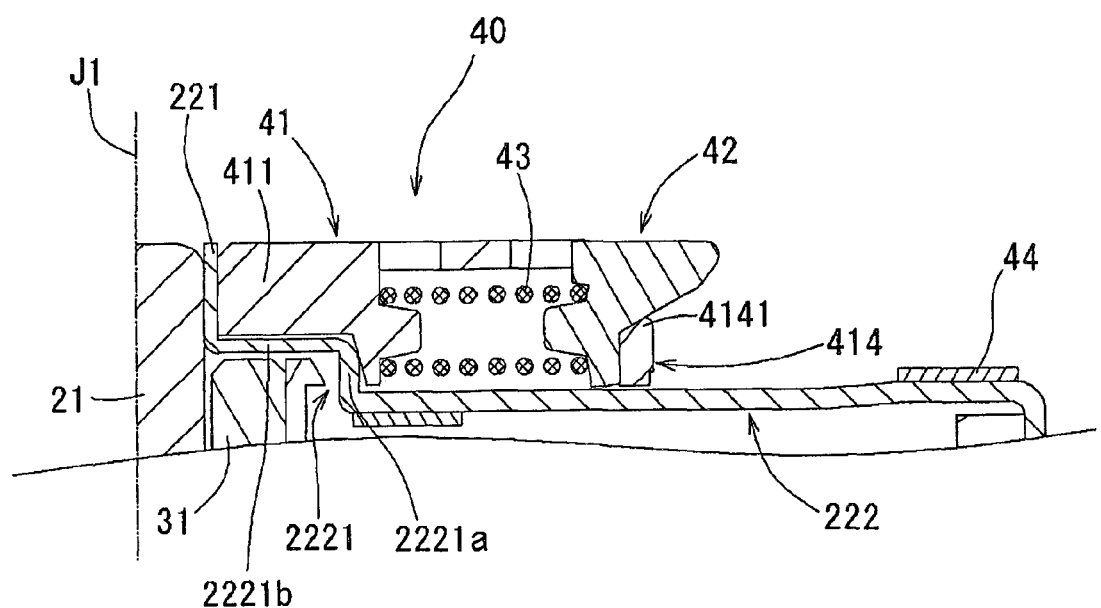
FIG. 2 is an enlarged view illustrating a chucking device of the motor shown in FIG. 1 and its vicinities.
Figure 3:
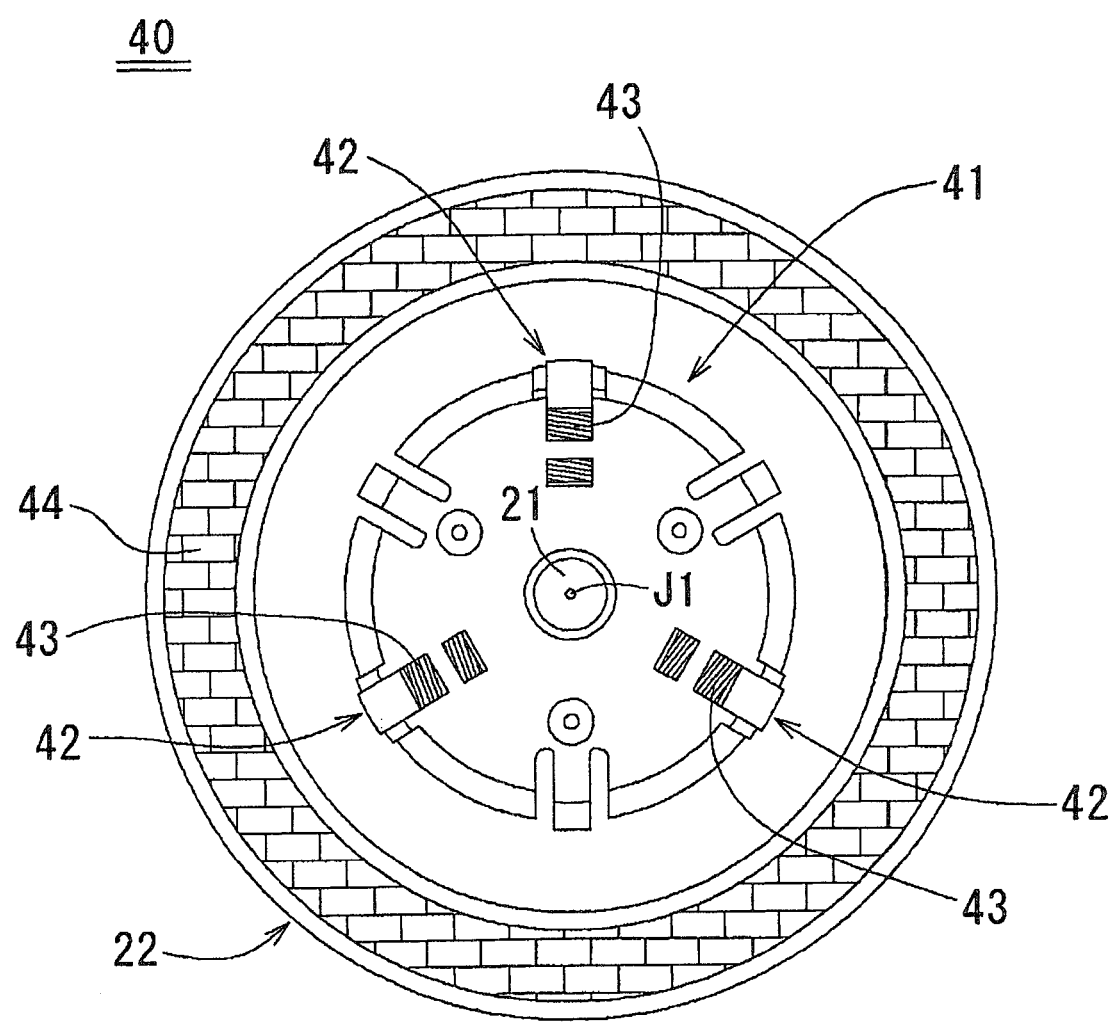
FIG. 3 is a top plan view showing the chucking device of the present invention.

Next, the chucking device 40 of the present invention will be described with reference to FIGS. 2 to 14. FIG. 2 is an enlarged view illustrating the chucking device and its vicinities. FIG. 3 is a top plan view of the chucking device 40.

Figure 4:
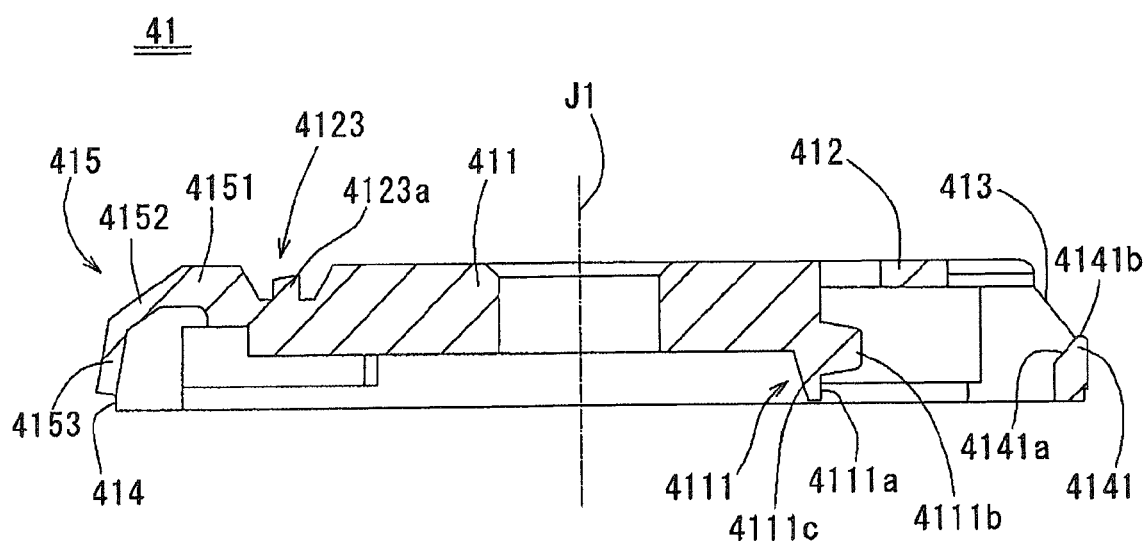
FIG. 4 is an axially-cut schematic section view showing a center case employed in the chucking device of the present invention.
Figure 5:
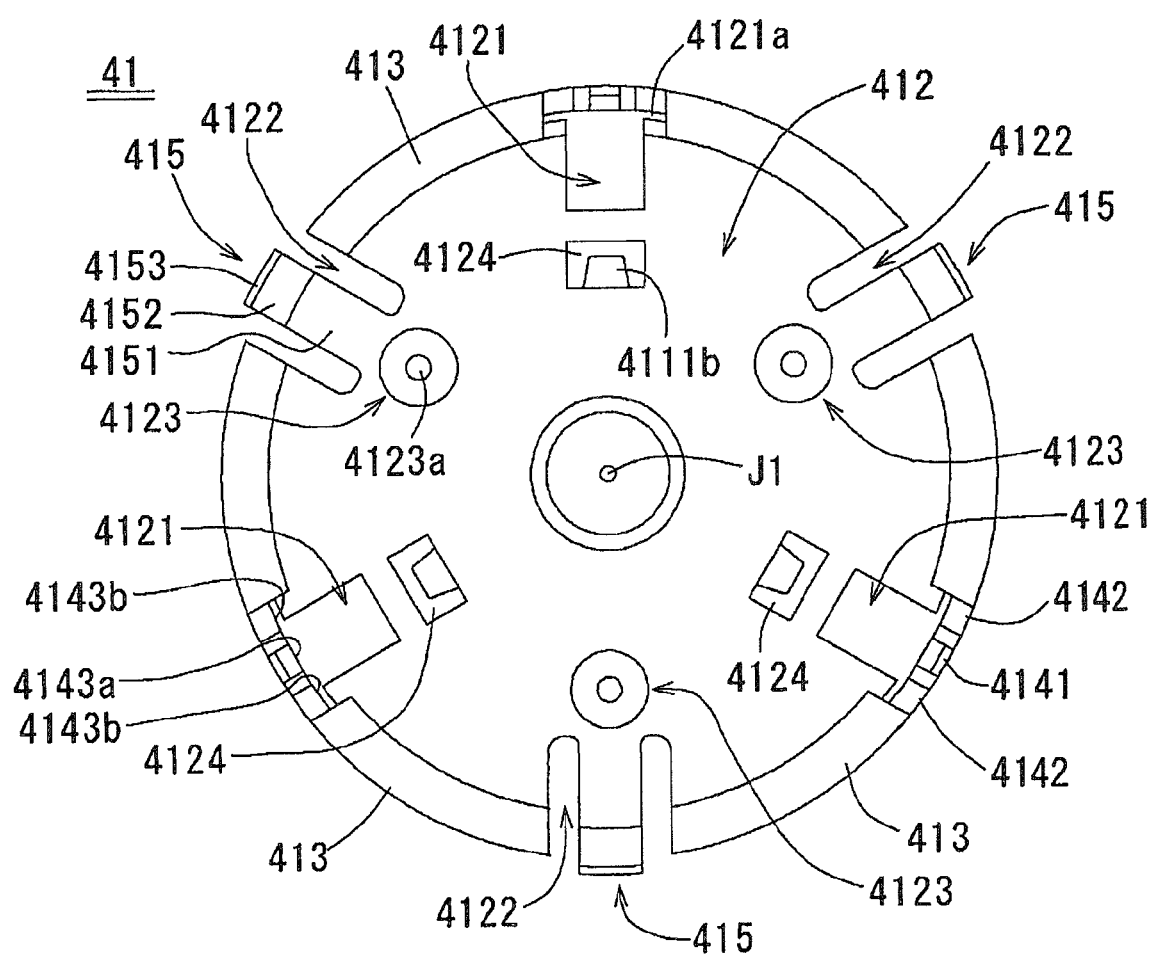
FIG. 5 is a top plan view of the center case employed in the chucking device of the present invention.
Figure 6:
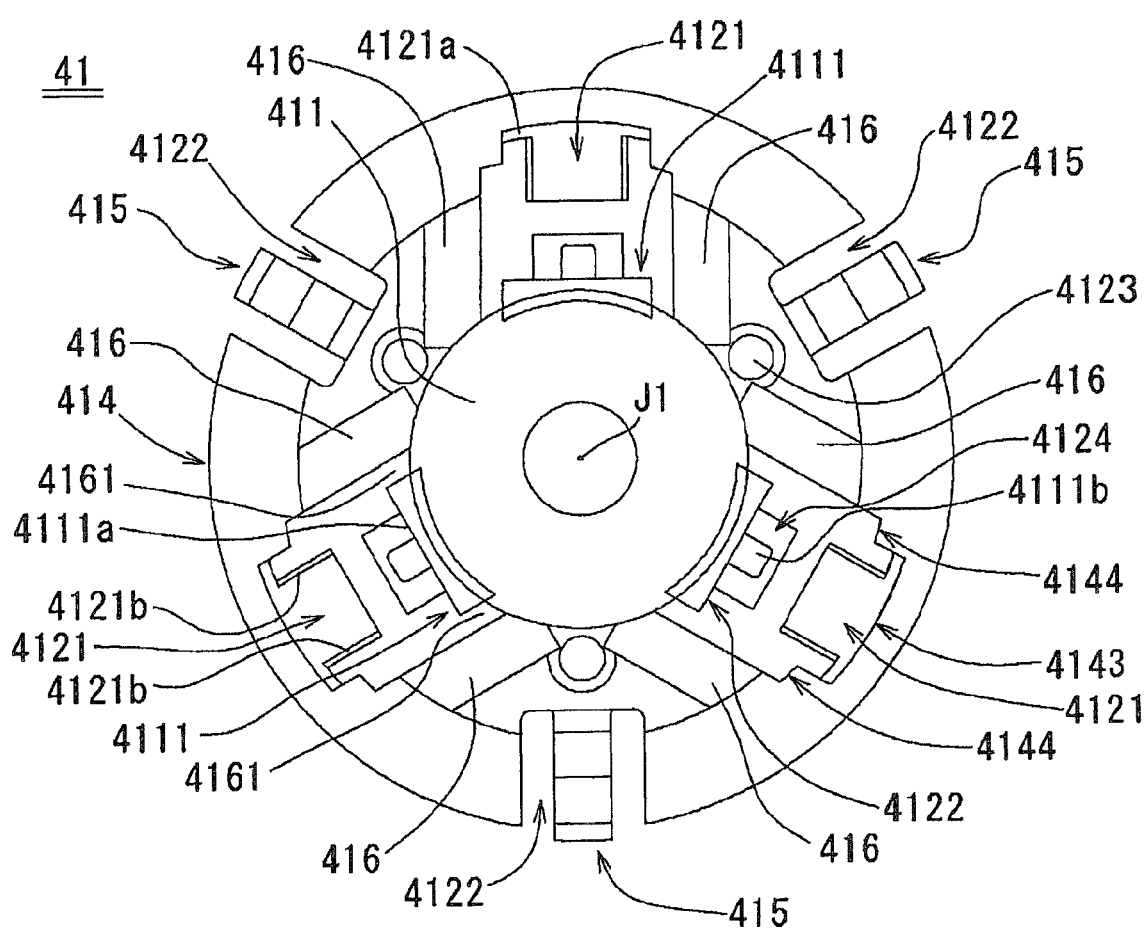
FIG. 6 is a bottom plan view of the center case employed in the chucking device of the present invention.
Figure 7:
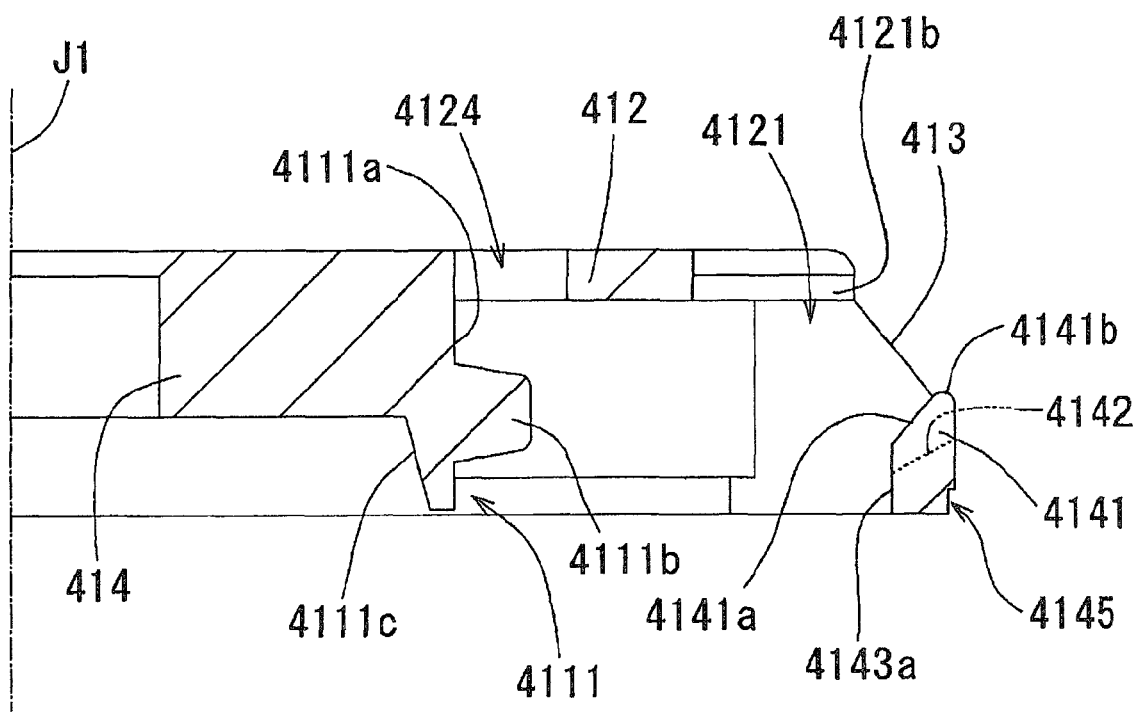
FIG. 7 is an enlarged view illustrating a rest portion of the center case shown in FIG. 4 and its vicinities.
Figure 8:
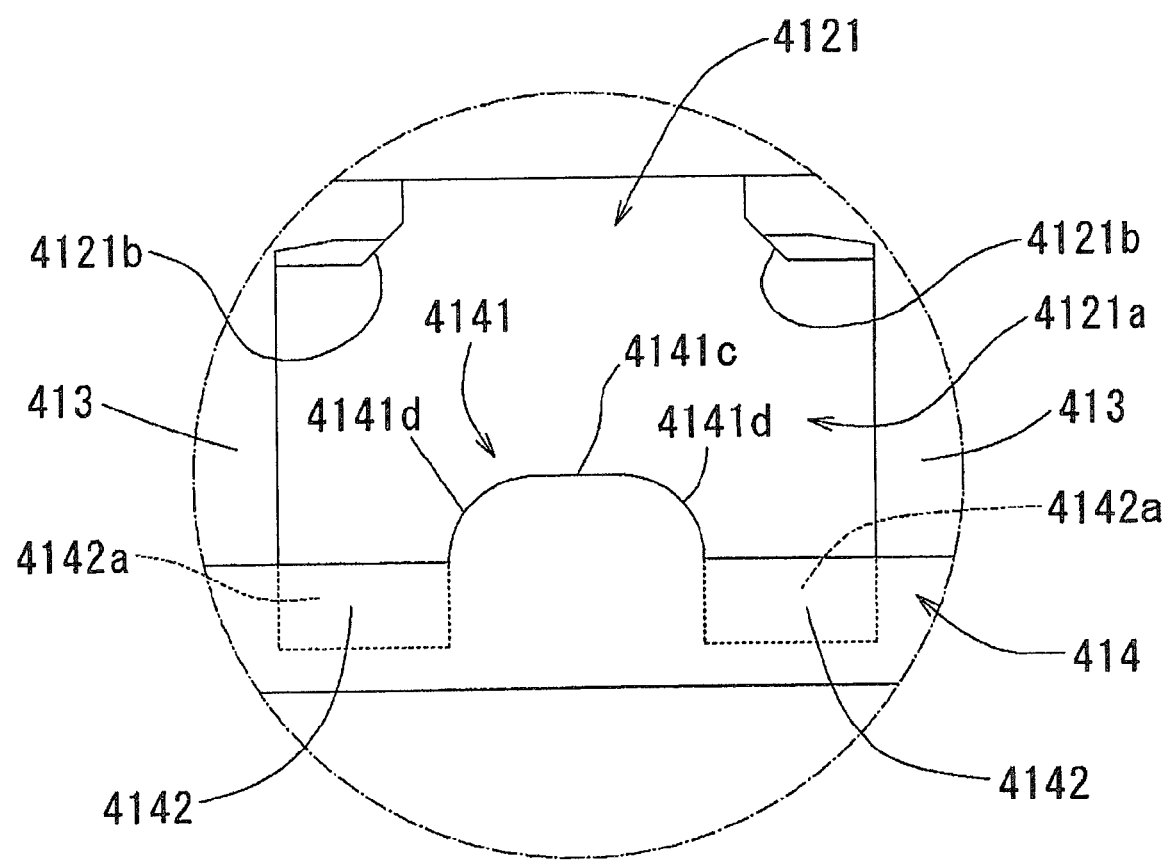
FIG. 8 is a radial view illustrating the rest portion of the center case employed in the chucking device of the present invention and its vicinities.

FIGS. 4 to 8 show a center case 41 employed in the chucking device 40. Specifically, FIG. 4 is an axially-cut schematic section view of the center case 41, FIG. 5 being a top plan view of the center case 41 and FIG. 6 being a bottom plan view of the center case 41. FIGS. 7 and 8 are enlarged views showing the rest portion 4141 of the chucking device 40 and its vicinities. Specifically, FIG. 7 is an enlarged view illustrating the rest portion 4141 and its vicinities. FIG. 8 is a front view of the rest portion 4141.

Figure 9:
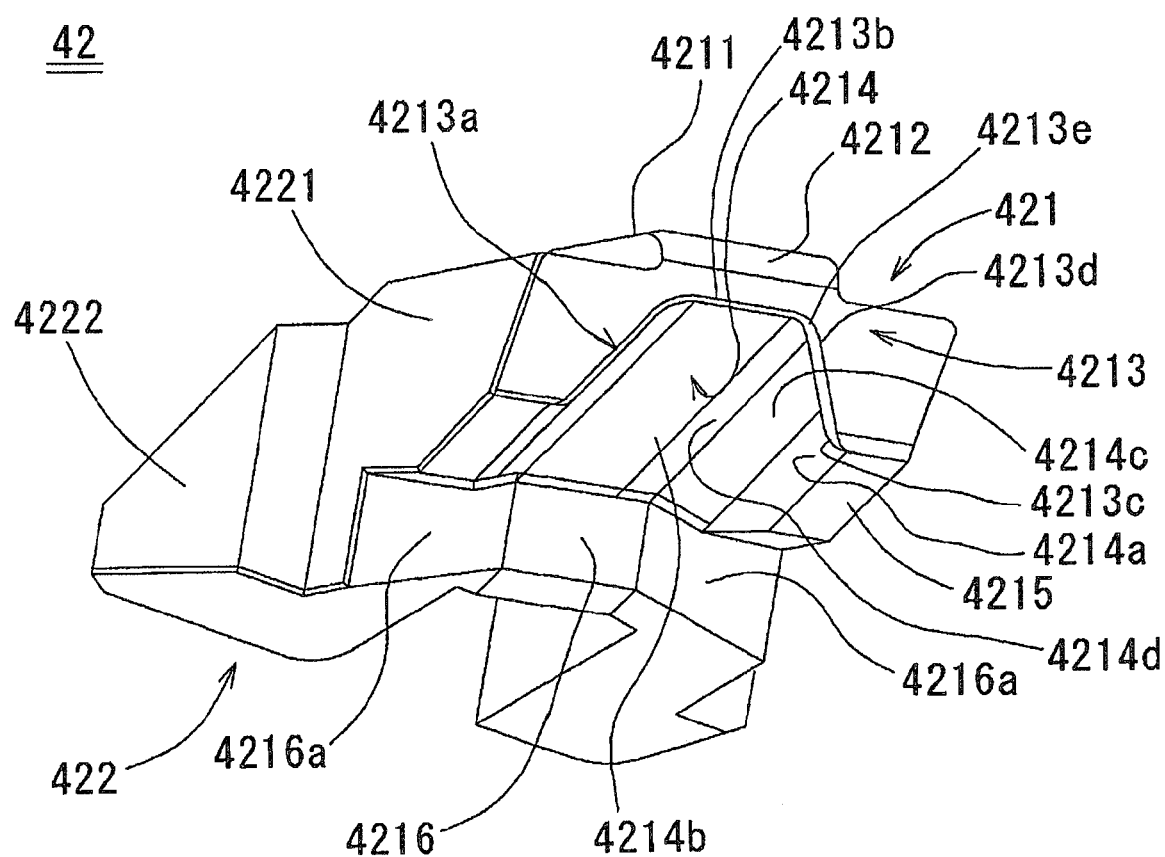
FIG. 9 is a perspective view showing a claw member employed in the chucking device of the present invention.
Figure 10:
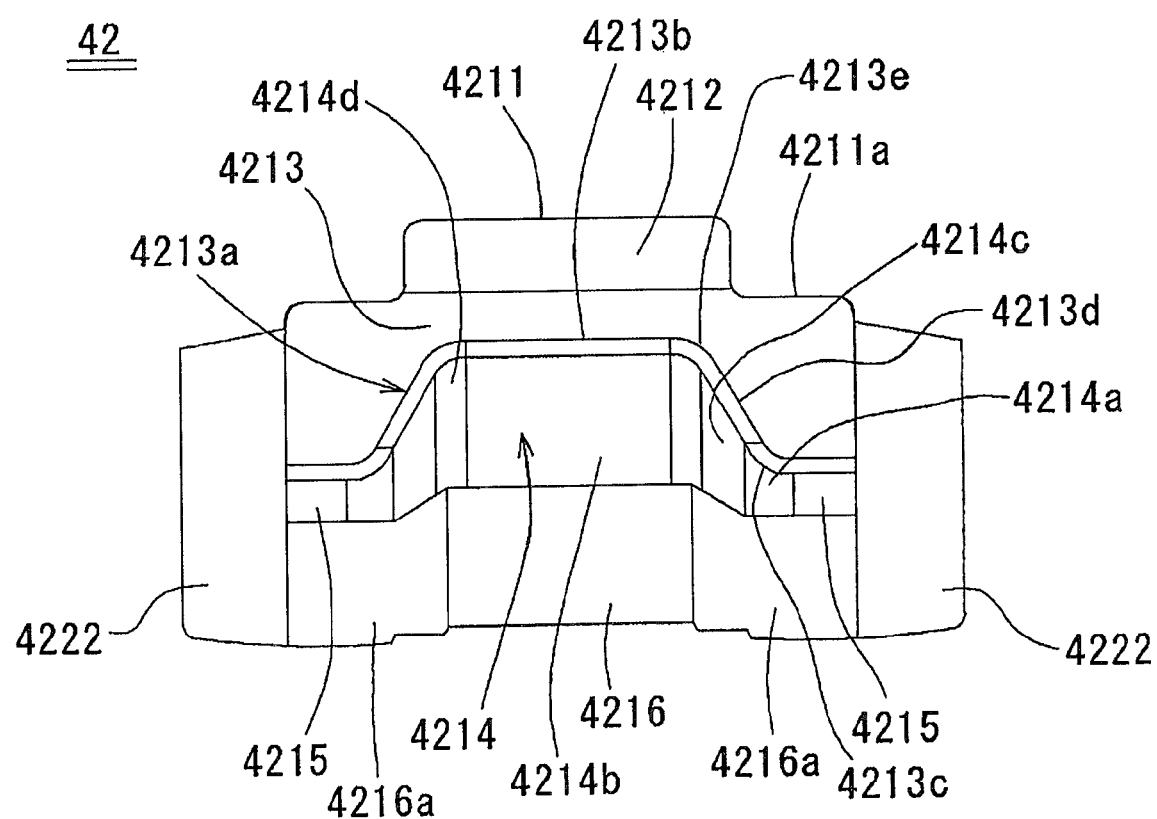
FIG. 10 is a front view of the claw member employed in the chucking device of the present invention.
Figure 11:
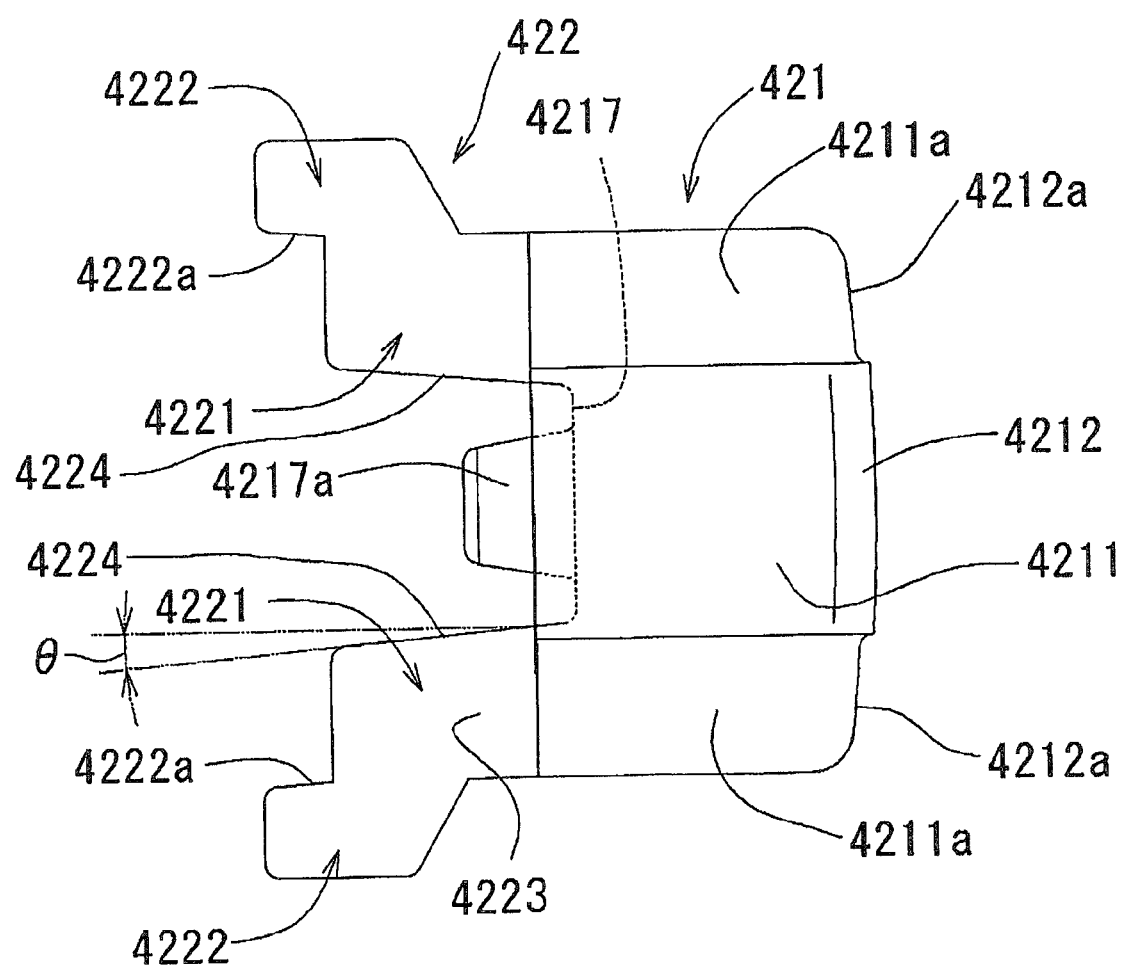
FIG. 11 is a top plan view of the claw member employed in the chucking device of the present invention.
Figure 12:
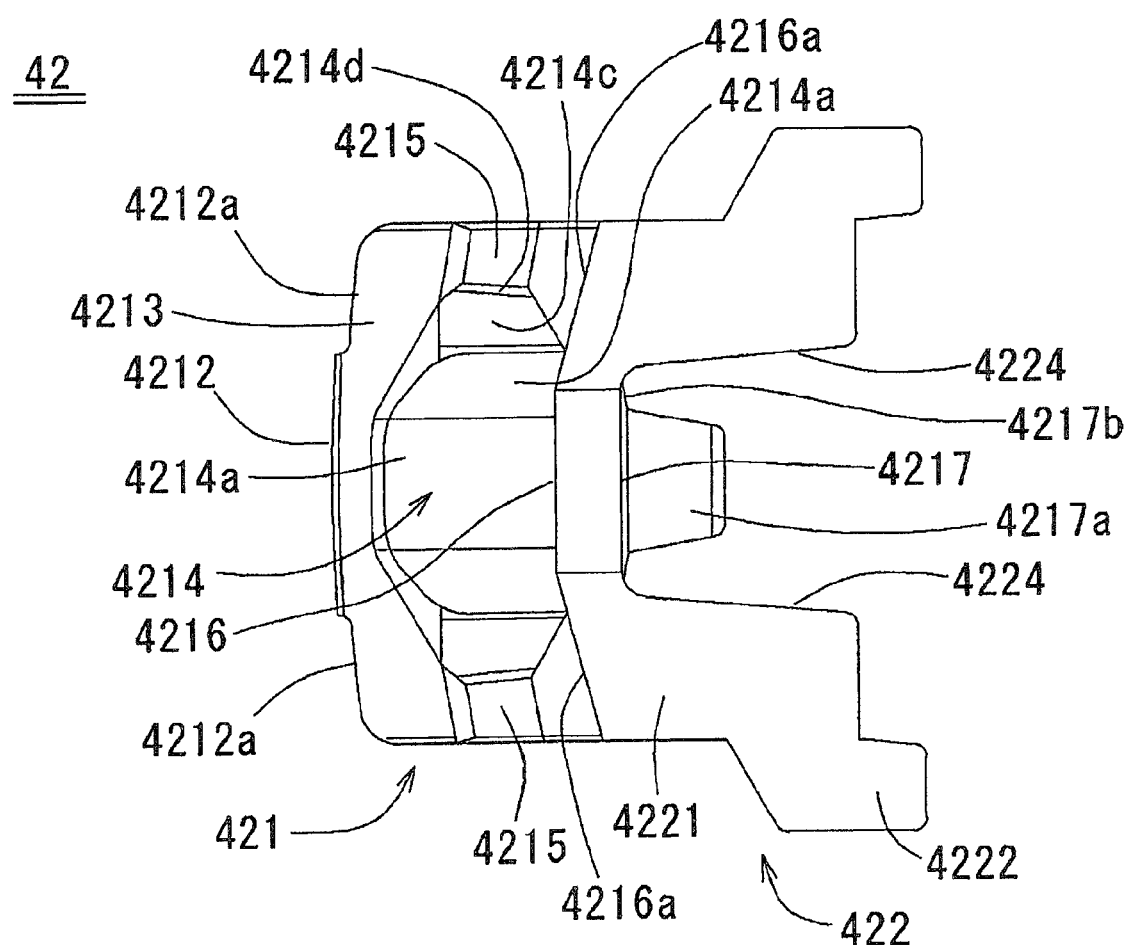
FIG. 12 is a bottom plan view of the claw member employed in the chucking device of the present invention.
Figure 13:
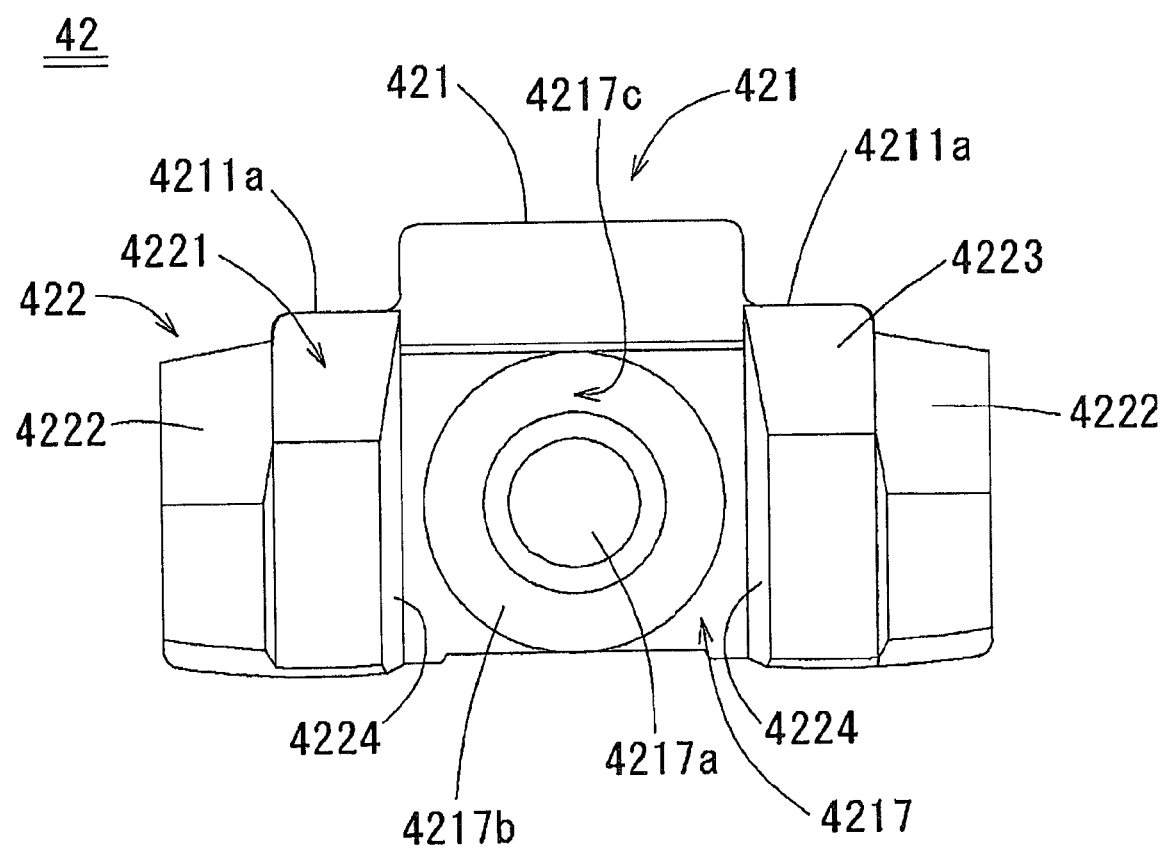
FIG. 13 is a rear view of the claw member employed in the chucking device of the present invention.
Figure 14:
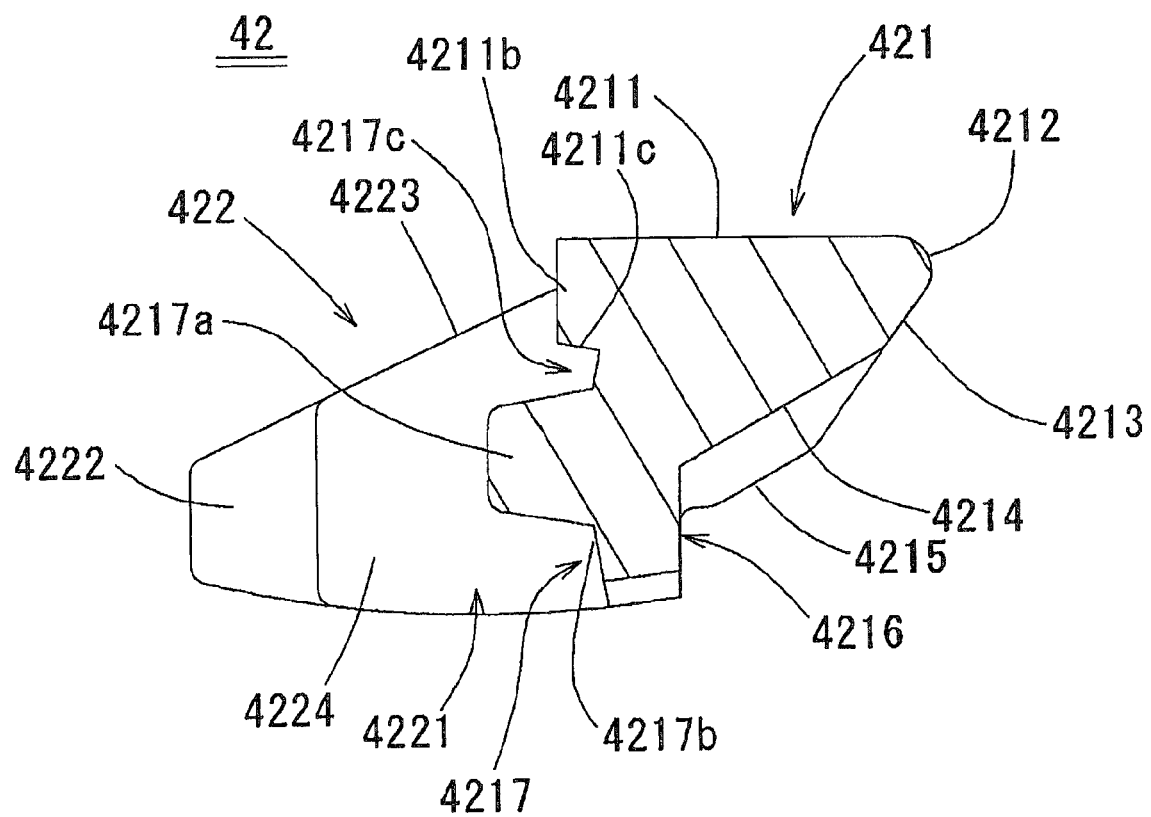
FIG. 14 is an axially-cut schematic section view of the claw member employed in the chucking device of the present invention.

FIGS. 9 to 14 show a claw member 42 of the chucking device 40. Specifically, FIG. 9 is a perspective view of the claw member 42, FIG. 10 being a front view of the claw member 42, FIG. 11 being a top plan view of the claw member 42, FIG. 12 being a bottom plan view of the claw member 42, FIG. 13 being a rear view of the claw member 42, and FIG. 14 being an axially-cut schematic section view of the claw member 42.

Referring to FIGS. 2 and 3, the chucking device 40 includes a generally disk-like center case 41 arranged in a coaxial relationship with the center axis J1, radially movable claw members 42 (three claw members in the present embodiment) protruding from the center case 41, resilient members 43 (coil springs in the present embodiment) received within the center case 41 for radially outwardly biasing the respective claw members 42, and a disk support portion 44 arranged radially outwardly of the center case 41 and adapted to make contact with a lower surface of a disk (not shown).

Referring to FIG. 2, the central protrusion portion 2221 of the rotor holder 22 includes an inner cylindrical portion 2221a and an inner cover portion 2221b for interconnecting the inner cylindrical portion 2221a and the shaft-fixed portion

221. The inner cover portion 2221b is joined to the shaft-fixed portion 221 at its inner circumferential edge.

The center case 41 includes a below-mentioned base portion 411 whose inner circumferential surface is brought into contact with and fixedly secured to the outer circumferential surface of the shaft-fixed portion 221. The base portion 411 has a lower surface that does not make contact with an upper surface of the inner cover portion 2221b. In other words, a minute axial gap is left between the lower surface of the base portion 411 and the upper surface of the inner cover portion 2221b. The center case 41 includes a below-mentioned cylindrical portion 414 whose lower surface does not make contact with an upper surface of the cover portion 222. In other words, a minute axial gap is left between the lower surface of the cylindrical portion 414 and the upper surface of the cover portion 222. These structures make it possible to highly accurately attach the center case 41 to the rotor holder 22 without affecting the parallelism of the lower surface of the base portion 411 and the parallelism of the lower surface of the cylindrical portion 414. Therefore, it becomes possible to accurately set the axial and radial positions of rest portions 4141 formed in the center case 41, which prevent deviation in the movement of the respective claw members 42.

Referring to FIGS. 4 to 9, the center case 41 is integrally formed by injection-molding a resin material such as polycarbonate or the like. The center case 41 includes a base portion 411 having an inner circumferential surface that makes contact with the outer circumferential surface of the shaft-fixed portion 221, a cover portion 412 formed on an axial upper side of the base portion 411 in such a fashion as to extend radially outwardly from the outer circumferential surface of the base portion 411, an axially downwardly inclined guide portion 413 extending radially outwardly from an outer circumferential edge of the cover portion 412, a cylindrical portion 414 extending axially downwardly from an outer circumferential edge of the guide portion 413 and an aligning claw 415 (three aligning claws in the present embodiment) circumferentially spaced apart 180 degrees from the claw member 42.

The lower surface of the base portion 411 is formed axially above the lower surface of the cylindrical portion 414, and axially below the upper end of the cylindrical portion 414. A plurality of contact portions 4111 is formed on the outer circumferential surface of the base portion 411 at an interval of about 120 degrees in a circumferential direction. Each of the contact portions 4111 makes contact with a radial inner end of the resilient member 43. Each of the contact portions 4111 has a lower surface extending axially downwardly, which is located below the lower surface of the base portion 411 and above the lower surface of the cylindrical portion 414. This allows the radial inner end of the resilient member 43 to make contact with only a below-mentioned contact surface 4111a, which means that the positioning accuracy of the radial inner end of the resilient member 43 depends on the surface accuracy of the contact surface 4111a alone. Therefore, it is possible to increase the positioning accuracy of the radial inner end of the resilient member 43. Moreover, by forming the lower surface of each of the contact portions 4111 axially above the lower surface of the cylindrical portion 414, it is possible to prevent the lower surface of each of the contact portions 4111 from making contact with the upper surface of the cover portion 222 of the rotor holder 22. Consequently, it is possible to accurately arrange the center case 41 relative to the rotor holder 22.

The contact surface 4111a is formed on an outer surface of each of the contact portions 4111 in a generally perpendicular relationship with the extension direction of the resilient member 43. A radially outwardly extending protrusion portion 4111b having a generally columnar shape is formed at the center of the contact surface 4111a. The radial inner surface of each of the contact portions 4111 is extended circumferentially along the outer circumferential surface of the inner cylindrical portion 2221a of the central protrusion portion 2221 of the rotor holder 22 in order to avoid contact between the radial inner surface of each of the contact portions 4111 and the outer circumferential surface of the inner cylindrical portion 2221a. The radial inner surface of each of the contact portions 4111 is formed of a slanting portion 4111c inclined radially inwardly and axially upwardly (toward the cover portion 412). The slanting portion 4111c serves to increase the thickness of each of the contact portions 4111, thereby improving the strength of the contact portions 4111. This makes it possible to have the radial position of the contact surface 4111a come closer to the outer circumferential surface of the inner cylindrical portion 2221a of the central protrusion portion 2221 of the rotor holder 22. Therefore, it is possible to increase the radial distance between the contact surface 4111a and the cylindrical portion 414 of the center case 41. As a result, it becomes possible to increase the space in which the claw member 42 and the resilient member 43 are installed. This makes it possible to improve the design flexibility in respect of the radial inward movement of the claw member 42. It is also possible to improve the design flexibility in respect of the radial inward movement of the resilient member 43.

Connection portions 416 extend radially outwardly from the outer surface of the base portion 411. The connection portions 416 are joined to the inner circumferential surface of the cylindrical portion 414 (or the guide portion 413) and also to the lower surface of the cover portion 412. The connection portions 416 are formed on the opposite circumferential sides of each of the contact portions 4111 in a mutually parallel relationship. Each of the connection portions 416 has a lower surface positioned axially above the lower surface of the cylindrical portion 414.

A pair of circumferential gaps exists between the individual contact portion 4111 and the connection portions 416. The gaps are formed to extend radially inwardly from the contact surface 4111a. In other words, a pair of radially inwardly recessed groove portions 4161 (contact-proof portions) is formed.

The cover portion 412 has openings 4121 formed in such positions as to retractably receive the respective claw members 42 and openings 4122 formed in alignment with the respective aligning claws 415.

The openings 4121 are formed in the guide portion 413 to extend to an axial upper portion of the cylindrical portion 414. The opening 4121 is provided with a wide opening portion 4121a having an increased circumferential width, the wide opening portion 4121a being formed between an upper end of the guide portion 413 and an axially lower side thereof, and a slant portion 4121b having an axially upwardly decreasing circumferential width, the slant portion 4121b being formed in the guide portion 413 to extend axially upwardly from the wide opening portion 4121a. The slant portion 4121b helps avoid generation of burrs which would otherwise be generated when a mold is released during an injection molding process. In case of a low-profile disk drive apparatus, an axial gap having a size of no greater than about 0.1 mm exists between the upper surface of the cover portion 412 of the chucking device 40 and the lower surface of a moving disk. Therefore, if axially upwardly protruding burrs are generated, damage may possibly be caused to the lower surface of the disk. This leaves a possibility that errors may occur in the course of recording and reproducing the disk. In accordance with the present embodiment, generation of axially upwardly protruding burrs is prevented by forming the slant portion 4121b, so that it becomes possible to avoid damage of the lower surface of the disk. As a result, it is possible to provide a motor provided with a highly reliable chucking device that helps keep a disk free from damage when the disk is moved to the chucking device.

The opening 4122 is formed on the opposite circumferential sides of the aligning claw 415. The opening 4122 is opened in both the guide portion 413 and the cylindrical portion 414 with the same width.

The cover portion 412 has three gate portions 4123 formed in the positions in which a resin material is injected during an injection molding process. Each of the gate portions 4123 is formed into a cylindrical groove shape. A cylindrical protrusion 4123a is arranged in each of the gate portions 4123. The protrusion 4123a is formed to extend axially upwardly below the upper surface of the cover portion 412. Each of the gate portions 4123 is formed radially outwardly of the inner cylindrical portion 2221a of the central protrusion portion 2221 of the rotor holder 22. Each of the gate portions 4123 has a lower surface is formed axially downwardly below the lower surface of the base portion 411. This helps improve the flexibility in designing the depth of each of the cylindrically recessed gate portions 4123. Therefore, it is possible to easily design a mold by which the protrusion 4123a can be formed not to protrude axially upwardly beyond the upper surface of the cover portion 412. In this connection, a part of the upper surface of each gate portion 4123 may be overlapped with the base portion 411 in a radial direction.

An aperture 4124 for exposing the protrusion 4111b of the contact surface 4111a to the outside is formed in the cover portion 412 in alignment with the protrusion 4111b. This makes it possible to release a mold in an axial direction, thereby allowing the protrusion 4111b to be formed with ease.

The aligning claw 415 includes a first arm portion 4151 extending radially outwardly from the opening 4122 of the cover portion 412, a second arm portion 4152 extending in conformity with the inclination of the guide portion 413 and a third arm portion 4153 arranged radially outwardly of the cylindrical portion 414 to make contact with a central opening portion (not shown) of a disk. By making contact with the central opening portion of the disk, the third arm portion 4153 serves to bring the center of the central opening portion of the disk into alignment with the center of the chucking device 40.

The rest portions 4141 for guiding movement of the respective claw members 42 are formed in the cylindrical portion 414 in alignment with the respective openings 4121. On an inner circumference side of the rest portion 4141, there is formed a slanting surface 4141a inclined radially inwardly and axially downwardly. The slanting surface 4141a is a planar surface having no gradient in a circumferential direction. A curved surface portion 4141b is formed so that it can be joined to an outer edge of the slanting surface 4141a (namely, an upper end of the slanting surface 4141a). The curved surface portion 4141b includes an apex portion of the rest portion 4141. The curved surface portion 4141b is joined to the outer circumference of the rest portion 4141, i.e., the outer circumferential surface of the cylindrical portion 414. The slanting surface 4141a and the curved surface portion 4141b are mirror-machined. The surface roughness of the slanting surface 4141a and the curved surface portion 4141b is about 0.8 μm in terms of Ry. This makes it possible to smoothly guide radial inward movement of the claw member 42. Therefore, it is possible to reduce the force required in mounting a disk (the disk mounting force).

A straight portion 4141c is formed in the circumferential center of the rest portion 4141. Circumferential curved portions 4141d that extend away from the straight portion 4141c are formed on the opposite circumferential sides of the straight portion 4141c.

Connecting portions 4142 are formed to extend from the rest portion 4141 in a circumferential direction. The connecting portions 4142 are joined to the cylindrical portion 414. Each of the connecting portions 4142 has an upper slanting surface inclined radially inwardly and axially downwardly (as indicated by a broken line in FIGS. 7 and 8). The inclination angle of each of the connecting portions 4142 is preferably set as small as possible within an extent that it does not make contact with a below-mentioned claw-side slanting surface 4215 of the claw member 42 in a standby state. In this regard, the inclination angle refers to an acute angle that the slanting surface of each of the connecting portions 4142 makes relative to a plane perpendicular to the center axis J1. By reducing the inclination angle, it becomes possible to make high the axial position of an inner circumferential surface of each of the connecting portions 4142. In other words, it becomes possible to increase the axial width of the inner circumferential surface of each of the connecting portions 4142. As a consequence, it is possible to improve the strength of the connecting portions 4142. This makes it possible to provide a motor provided with a highly reliably chucking device that can keep the rest portion 4141 and the connecting portions 4142 free from plastic deformation even when a claw-side stopper 4216 of the claw member 42 makes contact with a below-mentioned planar portion 4143a of the rest portion 4141 in a repeated manner.

On the inner circumferential surface of the cylindrical portion 414 corresponding to the circumferential position of each of the openings 4121, there are formed a first recess portion 4143 that forms the inner circumferential surfaces of the rest portion 4141 and the connecting portions 4142 and second recess portions 4144 lying on the opposite circumferential sides of the first recess portion 4143.

The planar portion 4143a perpendicular to a radial direction is formed in the circumferential center of the first recess portion 4143. Curved surface portions 4143b having the same radius of curvature as that of the inner circumferential surface of the cylindrical portion 414 are formed on the opposite circumferential sides of the planar portion 4143a of the first recess portion 4143. The below-mentioned claw-side stopper 4216 of the claw member 42 makes contact with the planar portion 4143a. The planar portion 4143a has substantially the same circumferential width as that of the rest portion 4141.

Furthermore, the first recess portion 4143 has substantially the same circumferential width as that of a below-mentioned claw portion 421 of the claw member 42. This makes it possible to restrict circumferential movement of the claw member 42. The radial moving distance of the claw member 42 can be increased by forming the first recess portion 4143 radially outwardly of the inner circumferential surface of the cylindrical portion 414. Therefore, it is possible to improve the flexibility in designing the radial movement of the claw member 42.

The second recess portions 4144 are formed radially inwardly of the first recess portion 4143 and also radially outwardly of the inner circumferential surface of the cylindrical portion 414. Each of the second recess portions 4144 has substantially the same circumferential width as that of a lateral extension portion 4222 of a wing portion 422 of the claw member 42 which will be described below. This makes it possible to improve the flexibility in designing the radial movement of the claw member 42 so that the lateral extension portion 4222 can move radially outwardly of the inner circumferential surface of the cylindrical portion 414. It is also possible to increase the radial thickness of the cylindrical portion 414, thereby enhancing the strength of the cylindrical portion 414. This is particularly desirable in a chucking device that needs to be fabricated into a low profile.

A reduced diameter portion 4145 whose outer diameter is reduced in a radial direction is formed in a lower portion of the outer circumferential surface of the cylindrical portion 414 including the bottom end thereof. The reduced diameter portion 4145 helps prevent generation of axially downwardly protruding burrs which would otherwise be generated when a mold is released in an axial direction during the process of injection-molding the center case 41. Therefore, it is possible to reliably prevent the lower surface of the cylindrical portion 414 from making contact with the upper surface of the cover portion 222. This makes it possible to accurately attach the center case 41 with respect to the rotor holder 22.

Referring to FIGS. 9 to 14, the claw member 42 is integrally formed by injection-molding a resin material such as polyacetal or the like. The claw member 42 includes a claw portion 421 having a disk holding surface 4213 for holding a disk in place and a pair of wing portions 422 extending radially inwardly from the claw portion 421.

The claw portion 421 includes a guide portion 4211 with which a disk makes contact for the first time among other portions of the claw member 42 when mounting the disk to the chucking device 40, a tip end portion 4212 of curved surface shape bulged radially outwardly from an outer circumferential edge of the guide portion 4211, the disk holding surface 4213 joined to the tip end portion 4212 and inclined radially inwardly and axially downwardly, a sliding portion 4214 formed into a recessed shape on a circumferential center region of the disk holding surface 4213 and claw-side slanting portions 4215 joined to the disk holding surface 4213 and formed below the disk holding surface 4213.

The guide portion 4211 is formed into a planar surface substantially parallel to the upper surface of the cover portion 412 of the center case 41. The guide portion 4211 has a circumferential width smaller than that of the disk holding surface 4213. On the opposite circumferential sides of the guide portion 4211, there is formed a pair of upper contact surfaces 4211a that makes contact with the lower surface of the cover portion 412 of the center case 41. The guide portion 4211 protrudes axially upwardly from the upper contact surfaces 4211a (and therefore may be called an upper protrusion portion). The guide portion 4211 is arranged substantially in the same axial position as that of the upper surface of the cover portion 412 of the center case 41. It may be possible to lower the axial height of the guide portion 4211 within the extent of thickness of the cover portion 412. If the guide portion 4211 is arranged axially above the cover portion 412, there is a possibility that the disk (not shown) may make contact with the guide portion 4211 when it is moved near the upper surface of the center case 41. In the present embodiment, however, the guide portion 4211 is arranged substantially in the same axial position as that of the upper surface of the cover portion 412 or the axial height of the guide portion 4211 is lowered within the extent of thickness of the cover portion 412. This makes it possible to provide a highly reliable motor that can keep the disk out of contact with the guide portion 4211 during its radial movement across the upper surface of the center case 41 and a disk drive apparatus incorporating the motor. It is particularly desirable to apply the motor to a low-profile disk drive apparatus. Each of the upper contact surfaces 4211a has substantially the same radial length as that of the guide portion 4211. In an outer circumferential edge of each of the upper contact surfaces 4211a, there is formed a tip end side portion 4212a which is a curved surface having a radius of curvature smaller than that of the tip end portion 4212. The tip end side portion 4212a and the tip end portion 4212 are formed to have the same circumferential curvature when the claw member 42 is seen in a top plan view.

The tip end portion 4212 is formed to have substantially the same circumferential width as that of the guide portion 4211. It is preferred that the tip end portion 4212 be formed into the shape of an arc having a radius of 0.25 mm to 0.30 mm when the claw member 42 is seen in an axially-cut section view.

The disk holding surface 4213 serves to hold a disk in place by pressing the upper edge of the center opening portion of the disk in a state that the disk is mounted on the disk support portion 44. The disk holding surface 4213 has an upper portion formed over the entire circumference of the claw portion 421. On the lower side of the upper portion, there is formed a recess portion 4213a of generally curved surface shape having a straight portion 4213b at its center region. The disk holding surface 4213 is formed in such a fashion that the recess portion 4213a is centrally positioned in a circumferential direction. Therefore, the disk holding surface 4213 has an inverted U-like shape when seen in a front view. The disk holding surface 4213 has a pair of side surface regions formed on opposite circumferential sides of the recess portion 4213a. Each of the side surface regions is gradually widened as it comes closer to the tip end portion 4212. Thus, the recess portion 4213a has a gradually reducing circumferential width, consequently increasing the area of the disk holding surface 4213. This makes it possible to increase the area over which the disk holding surface 4213 makes contact with the center opening portion of the disk. Therefore, it is possible to prevent deformation of the disk by reducing the pressure applied to the center opening portion of the disk. As a result, it becomes possible to align the disk with increased accuracy. Furthermore, if the contact area between the disk holding surface 4213 and the center opening portion of the disk is increased as mentioned above, the resistant force against the upwardly moving force of the disk becomes greater. Owing to the fact that the disk holding surface 4213 of the claw member 42 exerts an increased resistant force against movement of the disk, it is possible to reliably hold the disk even when the disk is tilted by an external shock during its rotation.

The recess portion 4213a is formed of a first curved portion 4213c continuously extending as a curved surface in a circumferential direction from the disk holding surface 4213, a slanting portion 4213d inclined toward the straight portion 4123b and a second curved portion 4213e continuously extending as a curved surface in a circumferential direction from the slanting portion 4213d and the straight portion 4213b. In the straight portion 4213b, there is formed a slanting surface inclined radially inwardly and axially downwardly with no gradient in a circumferential direction. The straight portion 4213b has a circumferential width greater than that of the straight portion 4141c of the rest portion 4141. The second curved portion 4213e and the slanting portion 4123d of the recess portion 4213a are formed more gently than the curved surface portion 4141d of the rest portion 4141. This makes it possible to prevent the straight portion 4141c or other portions of the rest portion 4141 from making contact with the straight portion 4213b or other portions of the recess portion 4213a of the claw member 42. If other portions make contact with one other during radial inward movement of the claw member 42, such contact would hinder the movement of the claw member 42, thereby increasing the disk mounting force. In the present embodiment, however, it is possible to make the claw member 42 smoothly move in a radial inward direction by preventing any portions of the claw member 42 and the rest portion 4141 from making contact with one another. This makes it possible to reduce the disk mounting force.

A claw-side stopper 4216 is provided radially inwardly of the recess portion 4213*a*. The claw-side stopper 4216 restricts radial outward movement of the claw member 42 by making contact with the inner circumferential surface of the cylindrical portion 414 of the center case 41. The claw-side stopper 4216 is formed of a planar surface extending along a radial direction and also extending perpendicularly to an axial direction. The claw-side stopper 4216 is formed circumferentially within the recess portion 4213*a*. The claw-side stopper 4216 has a circumferential width greater than that of the straight portion 4213*b* of the recess portion 4213*a*. This ensures that the claw member 42 is stably kept in position without deviating in a circumferential direction. On the opposite circumferential sides of the claw-side stopper 4216, there are formed circumferential slanting portions 4216*a* inclined radially inwardly as they go away from the claw-side stopper 4216 in the circumferential direction. This eliminates the possibility that other portions of the claw member 42 than the claw-side stopper 4216 make contact with the inner circumferential surface of the cylindrical portion 414 of the center case 41. Therefore, it is possible to prevent the claw member 42 from tilting in the circumferential direction, which would otherwise occur when other portions of the claw member 42 than the claw-side stopper 4216 come into contact with the cylindrical portion 414 of the center case 41. This makes it possible to stably keep the claw member 42 in position.

The claw-side stopper 4216 is formed in such a manner that the circumferential width thereof becomes smaller than that of the planar portion 4143*a* formed on the inner circumferential surface of the cylindrical portion 414 of the center case 41. This construction ensures that the claw-side stopper 4216 makes contact with only the planar portion 4143*a*, thereby more stably keeping the claw member 42 in position.

On the rear surface of the claw portion 421, there is formed a claw-side contact surface 4217 that makes contact with the radial outer end of the resilient member 43. A generally conical protrusion portion 4217*a* that extends radially inwardly for engagement with the resilient member 43 is formed on the claw-side contact surface 4217. The resilient member 43 engages with the protrusion portion 4217*a*. In other words, the protrusion portion 4217*a* is inserted into a coil spring that constitutes the resilient member 43. The connecting portion between the protrusion portion 4217*a* and the contact surface 4217, i.e., the base surface of the protrusion portion 4217*a*, is formed of an annular slanting surface 4217*b* whose diameter is increased radially outwardly. The resilient member 43 comes into contact with the annular slanting surface 4217*b*. The annular slanting surface 4217*b* is arranged radially outwardly of an inner surface portion 4211*b* of the guide portion 4211. That is to say, when seen in a section view, a recess portion 4217*c* is formed in an axial gap between the inner surface portion 4211*b* of the guide portion 4211 and the protrusion portion 4217*a*. The axial gap between the resilient member 43 arranged in the recess portion 4217*c* and the inner surface portion 4211*b* of the guide portion 4211 is formed to have a size smaller than that of the axial gap between the resilient member 43 and the protrusion portion 4217*a*. This makes it possible to restrict axial movement of the resilient member 43 which would otherwise occur when the resilient member 43 is loosely engaged with the protrusion portion 4217*a*. Therefore, the resilient member 43 is able to impart a force to the claw member 42 in a specified direction, consequently assuring stable movement of the claw member 42. The lower surface of the inner surface portion 4211*b* (namely, the surface axially facing the resilient member 43) is formed of a slanting portion 4211*c* which is inclined so that the axial width of the recess portion 4217*c* can be increased in a radial inward direction. This allows the resilient member 43 to be easily inserted into the recess portion 4217*c* even when the axial gap between the resilient member 43 and the slanting portion 4211*c* is set small. This means that the resilient member 43 is capable of making good contact with the claw-side contact surface 4217 even when the axial width of the recess portion 4217*c* is set small. As a result, it becomes possible to assure stable movement of the claw member 42.

Each of the wing portions 422 includes a base portion 4221 formed on each of the opposite circumferential sides of the claw-side contact surface 4217 and a lateral extension portion 4222 formed radially inwardly and circumferentially outwardly of the base portion 4221.

The base portion 4221 is formed to have substantially the same circumferential width as that of the upper contact surface 4211*a*. The base portion 4221 has a slanting upper surface 4223 which is inclined radially inwardly and axially downwardly. The slanting upper surface 4223 has substantially the same inclination angle as that of the claw-side slanting surface 4215 of the claw portion 421. This allows a mold to be released with ease in an injection molding process.

The base portions 4221 of the respective wing portions 422 have inner surfaces 4224 circumferentially facing the resilient member 43. The inner surfaces 4224 of the base portions 4221 are inclined in such directions as to radially inwardly increase the circumferential width between the inner surfaces 4224. In the present embodiment, the inclination angle $\theta$ is equal to 5 degrees, where the inclination angle $\theta$ refers to an acute angle that each of the inner surfaces 4224 makes with respect to a radial plane. By doing so, the circumferential width between the narrowest portions of the mutually facing inner surfaces 4224 (namely, the portions making contact with the claw-side contact surfaces 4217) is made nearly equal to the outer diameter of the resilient member 43. As a result, it becomes possible to reduce circumferential free movement of the resilient member 43, consequently assuring stable movement of the claw member 42. Inasmuch as the inner surfaces 4224 are inclined as noted above, the circumferential gap between the mutually facing inner surfaces 4224 becomes greater than the outer diameter of the resilient member 43 in the radially inward side of the base portion 4221. This makes it easy to insert the resilient member 43 between the inner surfaces 4224 of the respective base portions 4221. As a consequence, it becomes possible to produce the chucking device with ease. The inner surfaces 4224 formed with an inclination angle make it easy to release a mold in an injection molding process.

The lateral extension portion 4222 extends radially inwardly from the base portion 4221. The lateral extension portion 4222 has a radial outer slating surface inclined radially inwardly as it goes away from the base portion 4221 in a circumferential direction. The slanting surface of the lateral extension portion 4222 radially faces the inner circumferential surface of the second recess portion 4144 of the center case 41. By forming the slanting surface in the lateral extension portion 4222, it is possible to prevent the slanting surface from making contact with the inner circumferential surface of the second recess portion 4144. Therefore, the claw member 42 does not make contact with the center case 41 in other portions than the claw-side stopper 4216 which makes contact with the planar portion 4143*a* of the first recess portion 4143 of the center case 41 since radial outward movement of the claw member 42 is restricted. As a result, it is possible to stably keep the circumferential position of the claw member 42 in a standby state.

The lateral extension portion 4222 circumferentially faces the groove portion 4161 formed between the individual contact portion 4111 and the connection portions 416 of the center case 41. This means that the lateral extension portion 4222 is allowed to move radially inwardly beyond the contact surface 4111a. As a result, it becomes possible to increase the distance by which the claw member 42 can move radially inwardly and also to improve the flexibility in designing radial inward movement of the claw member 42. It is also possible improve the flexibility in designing the radial length of each of the wing portions 422.

Seeing that the groove portion 4161 circumferentially faces the lateral extension portion 4222, it is possible to increase the circumferential width of each of the contact portions 4111. As set forth above, the inner circumferential surface of each of the contact portions 4111 is formed into a curved surface extending along the outer circumferential surface of the inner cylindrical portion 2221a of the rotor holder 22. Furthermore, the contact surface 4111a is a surface perpendicular to the radial direction. Therefore, each of the contact portions 4111 is formed to have a radial thickness gradually increasing toward the circumferential ends thereof. In this regard, the radial thickness of each of the contact portions 4111 is increased in the opposite circumferential ends thereof as the circumferential width of the individual contact portion 4111 becomes greater. This makes it possible to increase the strength of the contact portions 4111. It is preferred that each of the contact portions 4111 exhibits high strength, particularly because the resilient member 43 imparts a radially inwardly acting force to the individual contact portion 4111 and because the biasing force of the resilient member 43 shows a change in response to the radial movement of the claw member 42. Therefore, it is desirable to employ a structure having an increased circumferential width, just like the contact portions 4111 of the present embodiment.

The lateral extension portions 4222 have inner surfaces 4222a circumferentially facing the resilient member 43. The inner surfaces 4222a are formed of slanting surfaces inclined to get away from each other in a radial inward direction (at an inclination angle θ of about 5 degrees in the present embodiment, where the inclination angle θ refers to an acute angle that each of the inner surfaces 4222a makes with respect to a radial plane).

The upper surface of the lateral extension portion 4222 has the same inclination angle as that of the upper surface 4223 of the base portion 4221.

The lower surfaces of the base portion 4221 and the lateral extension portion 4222 are formed into a generally spherical shape. Therefore, the claw member 42 makes contact with the upper surface of the cover portion 222 of the rotor holder 22 at two points. In a standby state, each of the lower surfaces of the base portion 4221 and the lateral extension portion 4222 has a first contact portion 4225 (see FIG. 15) whose circumferential position lies on the center of each of the wing portions 422. Each of the lower surfaces is curved axially upwardly (namely, becomes distant from the cover portion 222) as it gets away from the first contact portion 4225. The radial position of the first contact portion 4225 is set radially inwardly of the claw portion 421.

<Standby State>

Next, the standby state of the chucking device 40 will be described with reference to FIG. 15, which shows an axially-cut schematic half-section view of the chucking device 40 kept in the standby state. The resilient member 43 is omitted in FIG. 15.

Figure 15:
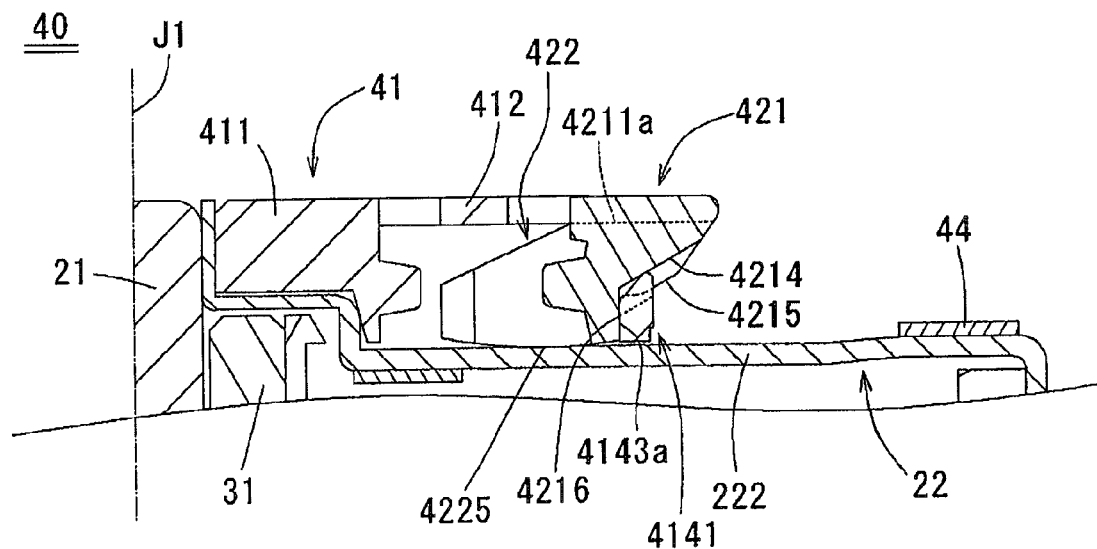
FIG. 15 is an axially-cut schematic half-section view illustrating the chucking device of the present invention kept in a standby state.

Referring to FIG. 15, the claw member 42 remains motionless in a state that the sliding portion 4214 of the claw portion 421 stays in contact with the rest portion 4141, the upper contact portions 4211a staying in contact with the lower surface of the cover portion 222, the first contact portion 4225 of each of the wing portions 422 staying in contact with the upper surface of the cover portion 222, and the claw-side stopper 4216 staying in contact with the planar portion 4143a of the rest portion 4141. Such contact keeps the claw member 42 in a given posture.

In the standby state, the claw-side slanting surface 4215 of the claw member 42 is kept closest to the connecting portion 4142 (indicated by a dot line in FIG. 15) that interconnects the rest portion 4141 and the cylindrical portion 414. The inner and outer circumferential edges of the upper slanting surface of the connecting portion 4142 may be located axially upwardly as long as the slanting surface does not make contact with the claw-side slanting surface 4215 in the standby state. This makes it possible to increase the axial height of the connection portion 416, consequently improving the strength of the connecting portion 4142.

In the standby state, the axial height of the guide portion 4211 is substantially the same as, or axially lower than, that of the upper surface of the cover portion 412 of the center case 41. This structure makes it possible to prevent the guide portion 4211 of the claw member 42 from making contact with the lower surface of a disk when the disk is moved in close proximity to the upper surface of the cover portion 412 of the chucking device 40.

<Operation of the Claw Member 42 during a Disk Mounting Process>

Figure 16:
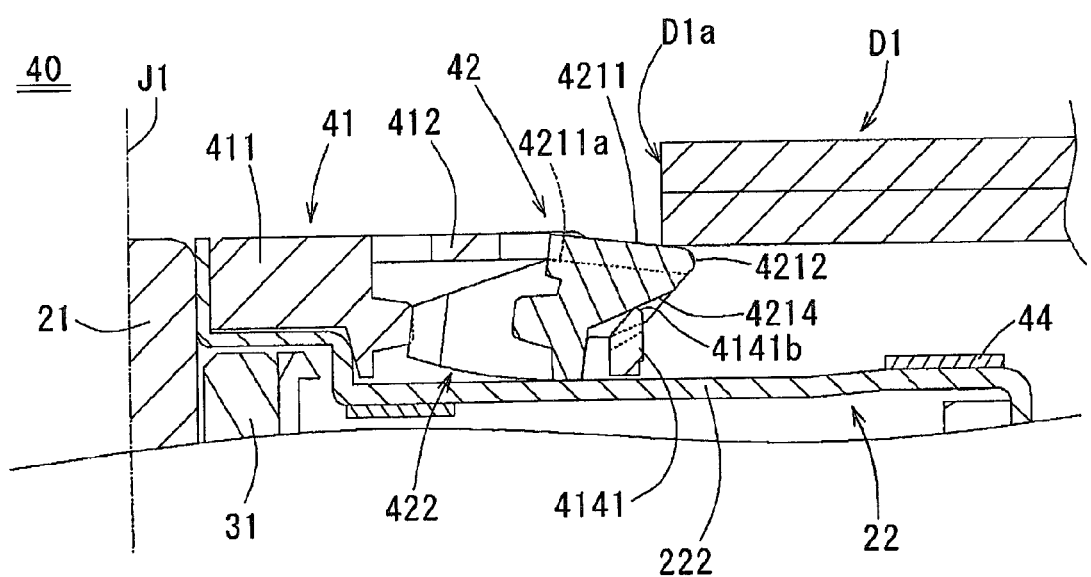
FIG. 16 is an axially-cut schematic half-section view illustrating a state that a disk is being mounted to the chucking device of the present invention.
Figure 17:
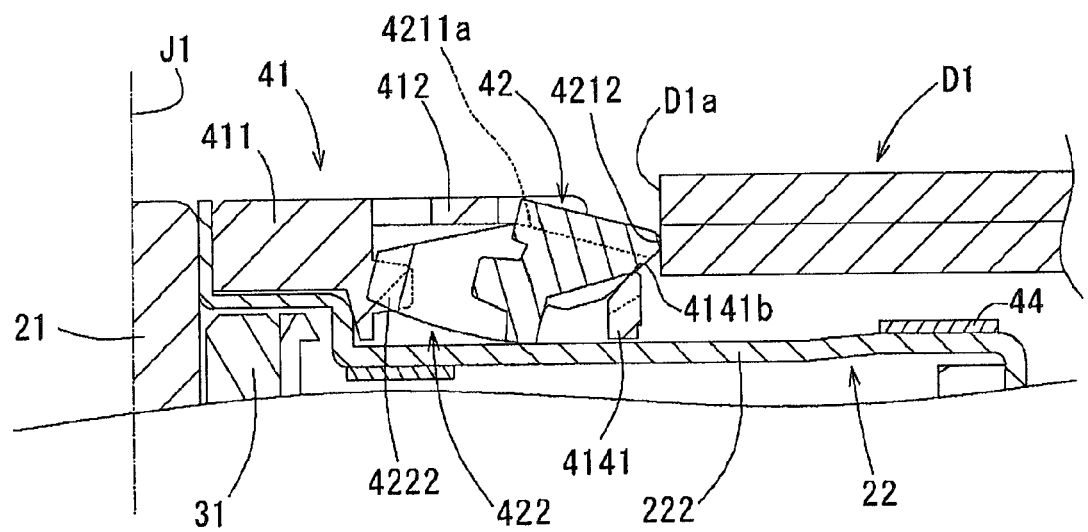
FIG. 17 is another axially-cut schematic half-section view illustrating a state that the disk is being mounted to the chucking device of the present invention.
Figure 18:
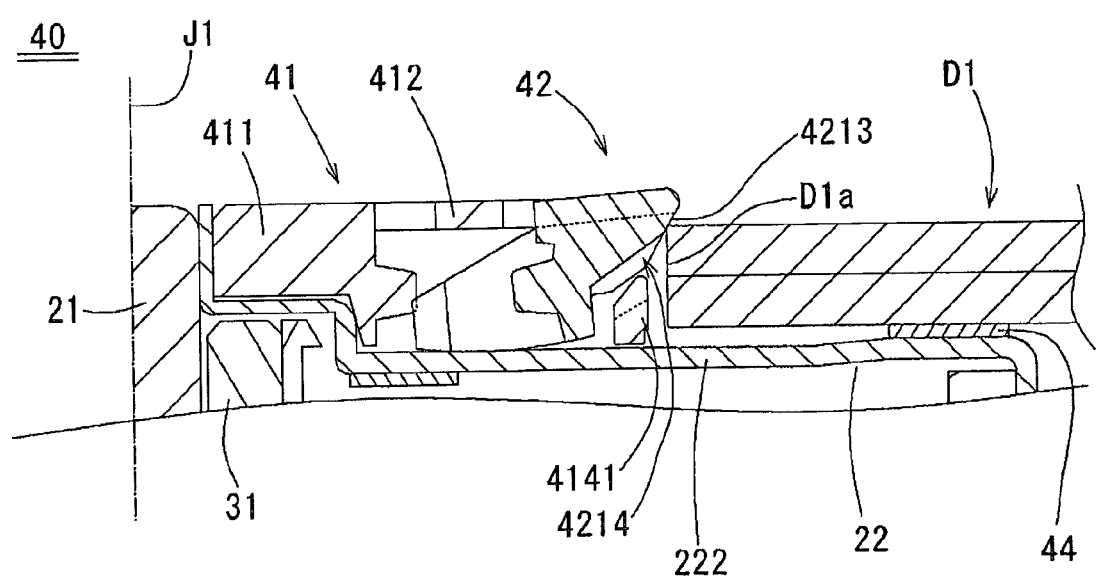
FIG. 18 is an axially-cut schematic half-section view illustrating a state that the disk is completely mounted to the chucking device of the present invention.

Next, the operation of the claw member 42 when mounting the disk D1 to the chucking device 40 will be described with reference to FIGS. 16 to 18. FIG. 16 is a schematic half-section view illustrating a state that the disk D1 begins to make contact with the chucking device 40. FIG. 17 is a schematic half-section view illustrating a state that the claw member 42 is moved radially inwardly to the greatest possible extent. FIG. 18 is a schematic half-section view illustrating a state that the disk D1 is held in place by means of the claw member 42. In this connection, the disk D1 is a laminated disk produced by bonding two disk substrates together.

Referring to FIG. 16, the lower end of the central opening portion D1a of the disk D1 makes contact with the upper surface of the guide portion 4211 of the claw member 42. This causes the disk D1 to impart an axially downwardly acting force to the claw member 42. In response, the tip end portion 4212 of the claw member 42 is rotated axially downwardly about the contact point of the radial inner edges of the upper contact surface 4211a with the lower surface of the cover portion 412. Simultaneously with this rotation, the claw member 42 is moved radially inwardly, at which time the sliding portion 4214 is slid along the upper surface of the rest portion 4141.

Referring to FIG. 17, if the disk D1 is further moved axially downwardly in the state illustrated in FIG. 16, the inner circumferential surface of the central opening portion D1a of the disk D1 comes into contact with the tip end portion 4212 of the claw member 42. In this state, the tip end portion 4212 of the claw member 42 is kept moved axially downwardly to the greatest possible extent. Furthermore, the lateral extension portions 4222 of the claw member 42 are kept moved radially inwardly to the greatest possible extent. Moreover, the radial position of the lateral extension portions 4222 lies radially inwardly of the radial position of the contact surface 4111a of the center case 41. In other words, a part of each of the lateral extension portions 4222 is received within the groove portion 4161.

Referring to FIGS. 16 and 17, the lower surface of each of the wing portions 422 makes contact with the upper surface of the cover portion 222 in a radially outward position from the first contact portion 4225. Since the lower surface of each of the wing portions 422 is of a generally spherical shape, it makes point-to-point contact with the upper surface of the cover portion 222. This reduces the contact area between the wing portions 422 and the cover portion 222, thereby reducing the frictional force that acts between the claw member 42 and the cover portion 222. As a result, the claw member 42 is able to move radially inwardly in a smooth manner. Therefore, it is possible to reduce the force required to mount the disk D1 to the chucking device 40.

When the claw member 42 is moved radially inwardly, the sliding portion 4214 of the claw member 42 is slid along the curved surface portion 4141b of the rest portion 4141. This means that the sliding portion 4214 makes line-to-line contact with the rest portion 4141 during its sliding movement. This helps reduce the frictional force that acts between the sliding portion 4214 and the rest portion 4141. As a result, the claw member 42 is able to move radially inwardly in a smoother manner. Therefore, it is possible to further reduce the force required to mount the disk D1 to the chucking device 40.

Referring to FIG. 18, once the lower surface of the disk D1 is supported on the upper surface of the disk support portion 44, the tip end portion 4212 of the claw member 42 is moved axially upwardly from the state illustrated in FIG. 17. Furthermore, the claw member 42 is caused to move radially outwardly. The disk holding surface 4213 of the claw member 42 comes into contact with the upper edge of the central opening portion D1a of the disk D1, whereby the claw member 42 holds the disk D1 in place.

In the state illustrated in FIG. 18, the region of the disk holding surface 4213 lying on the tip end side above the recess portion 4213a makes contact with the upper edge of the central opening portion D1a of the disk D1. In other words, the continuously extending circumferential region of the disk holding surface 4213 makes contact with the upper edge of the central opening portion D1a of the disk D1. This helps increase the area over which the disk holding surface 4213 makes contact with the central opening portion D1a. Therefore, it becomes possible to reduce the pressure applied to the central opening portion D1a by the disk holding surface 4213. As a result, it is possible to prevent deformation of the disk D1 which would otherwise be caused by the disk holding surface 4213. This makes it possible to highly accurately align the disk D1 with the chucking device 40.

Since the disk D1 makes contact with the disk holding surface 4213 over a broad area, the disk D1 is hardly separated from the chucking device 40 even if a disk-tilting force is imparted to the disk D1 by an external shock or the like during rotation of the disk D1. This is because the increased contact area between the disk D1 and the disk holding surface 4213 serves to increase the frictional force acting when the central opening portion D1a is urged to move axially upwardly against the disk holding surface 4213. Therefore, it is possible to provide a motor provided with a highly reliable chucking device that can keep a disk from being removed during its rotation.

<Operation of the Claw Member in case of Mounting a Thin Disk>

Figure 19:
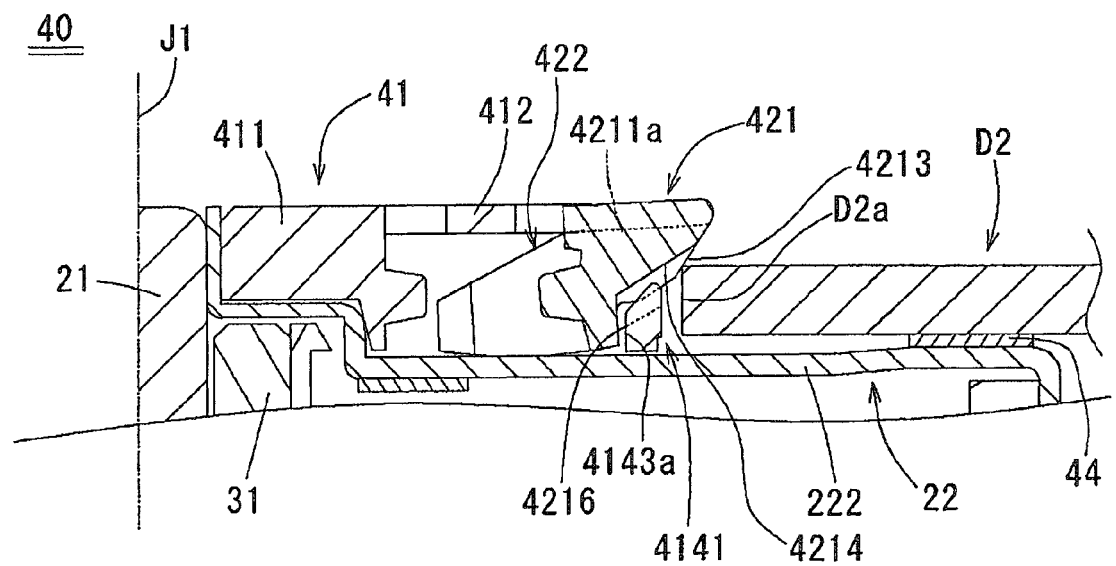
FIG. 19 is an axially-cut schematic half-section view illustrating a state that a disk with a reduced thickness is completely mounted to the chucking device of the present invention.

Next, the operation of the claw member 42 when a disk D2 having an axial thickness smaller than that of the disk D1 is mounted to the chucking device 40 will be described with reference to FIG. 19. FIG. 19 is an axially-cut schematic half-section view illustrating a state that the disk D2 is mounted to the disk mounting portion 44.

Referring to FIG. 19, when the disk D2 is mounted in place, the claw member 42 is moved more radially outwardly than when the disk D1 is mounted in place. This is because the upper edge of the central opening portion D2a of the disk D2 is positioned axially below that of the disk D1, thereby lowering the contact position between the disk holding surface 4213 and the upper edge of the central opening portion D2a of the disk D2. Since the disk holding surface 4213 is formed of a slanting surface inclined axially downwardly and radially inwardly, the contact point between the disk holding surface 4213 and the disk D2 having a reduced axial thickness lies more radially inwardly than the contact point between the disk holding surface 4213 and the disk D1. Therefore, the disk D2 remains in contact with the regions of the disk holding surface 4213 lying circumferentially outwardly of the recess portion 4213a.

When the disk D2 is mounted in place, the tip end portion 4212 of the claw member 42 lies more radially outwardly from the central opening portion D2a of the disk D2 than when the disk D1 is mounted in place. This means that the claw member 42 needs to be moved longer distance in a radial direction when removing the disk D2 from the chucking device 40 than when removing the disk D1. Therefore, the disk D2 is hard to remove from the chucking device 40 as compared to the disk D1.

<Disk Drive Apparatus>

Next, one embodiment of a disk drive apparatus equipped with the present motor will be described with reference to FIG. 20, which is an axially-cut schematic section view of the disk drive apparatus.

Figure 20:
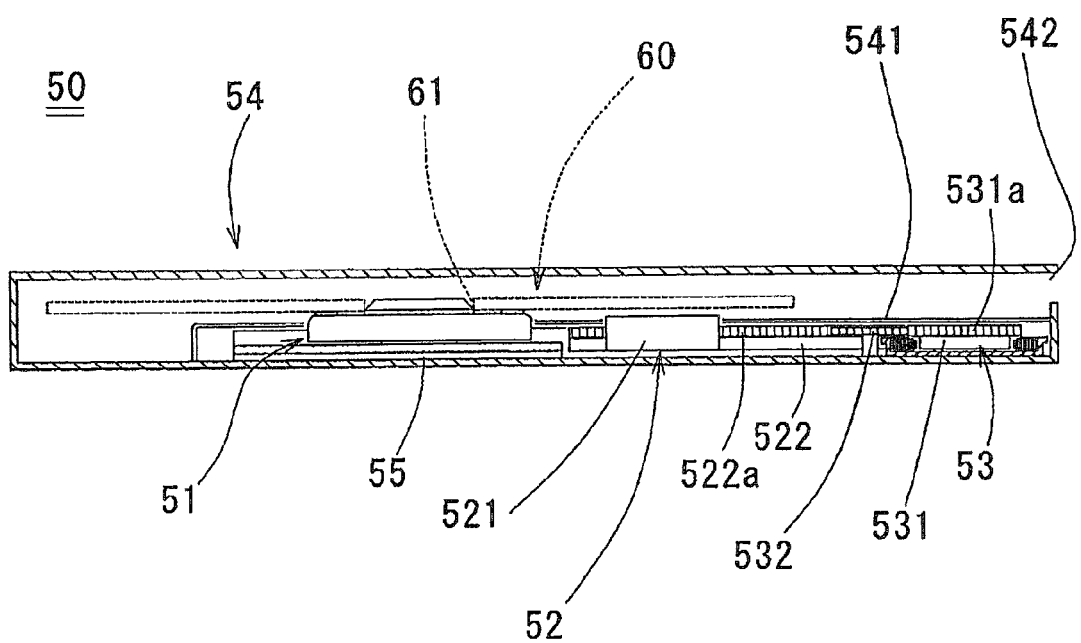
FIG. 20 is an axially-cut schematic half-section view showing a disk drive apparatus in accordance with the present invention.

Referring to FIG. 20, the disk drive apparatus 50 includes a spindle motor 51 for rotating a disk 60 having an opening 61 at its center, the motor 51 being inserted into the opening 61 of the disk 60 to bring the center of the opening 61 into coaxial alignment with the rotational axis of the disk 60, an optical pickup mechanism 52 for recording and reproducing information on and from the disk 60 by irradiating a laser beam toward the disk 60, a gear mechanism 53 for moving the optical pickup mechanism 52 in a radial direction of the disk 60, and a housing 54 for receiving the spindle motor 51, the optical pickup mechanism 52 and the gear mechanism 53.

The spindle motor 51 and the optical pickup mechanism 52 are held in place by means of a chassis 55. As the chassis 55 is caused to move at least in an axial direction, the disk 60 is mounted at the opening 61 to the chucking device of the spindle motor 51. The chassis 55 is provided with an aperture and the optical pickup mechanism 52 is arranged inside the aperture.

The gear mechanism 53 includes a motor 531, which has an output shaft and a driving gear attached to the output shaft, and a driven gear 532 for receiving a torque of the motor 531.

A thin partition plate 541 for isolating the disk 60 from the gear mechanism 53 is formed within the housing 54. Furthermore, the housing 54 has an access opening 542 through which the disk 60 is inserted and taken out.

The optical pickup mechanism 521 includes a recording and reproducing unit 521 for irradiating a laser beam and a moving unit 522 for moving the recording and reproducing unit 521, the moving unit 522 provided at a right angle relative to the moving direction of the recording and reproducing unit 521 that moves along the radial direction of the disk 60. The moving unit 522 has a meshing portion 522a that comes into meshing engagement with the driven gear 532. The recording and reproducing unit 521 is meshed with the moving unit 522 and consequently moved in the radial direction.

The driven gear 532 is rotated by coming into meshing engagement with a gear portion 531a attached to the motor 531. The moving unit 522 is moved in the radial direction because the driven gear 532 remains meshed with the meshing portion 522a of the moving unit 522. Upon movement of the moving unit 522, the recording and reproducing unit 521 is moved in the radial direction.

Application of the present motor 10 to the spindle motor 51 of the disk drive apparatus 50 makes it possible to provide a highly reliable disk drive apparatus that can prevent the disk 60 from being removed from the chucking device 40 during its rotation.

Accordingly, it becomes possible to provide a highly reliable disk drive apparatus capable of preventing recording and reproducing errors which would otherwise be generated when the disk 60 is mounted to the spindle motor 51.

While one embodiment of the present invention has been described hereinabove, the present invention is not limited thereto. Many changes or modifications may be made without departing from the scope of the claims.

What is claimed is:

1. A motor comprising:
    a chucking device for detachably holding a disk having a central opening portion;
    a rotating body rotatable about a specified center axis, the rotating body including a rotor magnet and a rotor holder, the rotor holder having a cylindrical portion for holding the rotor magnet in place, a cover portion extending from the cylindrical portion to the center axis and a disk support portion formed on an upper surface of the cover portion for making contact with a lower surface of the disk; and
    a fixed body including a bearing member for rotatably supporting the rotating body and a stator arranged to face the rotor magnet,
    wherein the chucking device includes: a center case to which the central opening portion of the disk is inserted, the center case having a cylindrical portion coaxial with the center axis and a cover portion for covering an axial upper side of the cylindrical portion of the center case, at least a part of the cylindrical portion of the center case arranged axially above the rotating body; resilient members received within the center case; and claw members for holding the disk in place, the claw members remaining in contact with radial outer ends of the respective resilient members,
    wherein each of the claw members has a tip end portion, a disk holding surface positioned axially below the tip end portion for holding the disk in place, and a recessed sliding portion formed substantially at a circumferential center region of the disk holding surface, the sliding portion serving to guide movement of the claw member,
    wherein rest portions are formed in the center case in a facing relationship with the respective sliding portions, the rest portions serving to support the respective sliding portions by contacting therewith,
    wherein the sliding portions are designed to make contact with the respective rest portions when the disk is mounted to the chucking device,
    wherein each of the sliding portions has a substantially planar slanting surface inclined radially inwardly and axially downwardly, and
    wherein each of the rest portions has an upwardly convex curved surface with which the corresponding sliding portion makes contact.

2. The motor of claim 1, wherein each of the rest portions has a circumferential width smaller than that of the sliding portion of the claw member.

3. The motor of claim 1, wherein each of the rest portions further has a slanting surface inclined radially inwardly and axially downwardly, the slanting surface being connected to the upwardly convex curved surface; and
    the slanting surface of each of the rest portions and a radial plane make an acute angle greater than an acute angle made by the sliding portion and the radial plane.

4. The motor of claim 1, wherein connecting portions are provided on opposite circumferential sides of each of the rest portions, the connecting portions connecting the corresponding rest portion to the cylindrical portion, and
    each of the connecting portions has an upper slanting surface inclined radially inwardly and axially downwardly, which faces the disk holding surface.

5. The motor of claim 4, wherein the upper slanting surface of the connecting portion and the radial plane makes an acute angle smaller than an acute angle made by the disk holding surface and the radial plane.

6. The motor of claim 1, wherein the claw member further has a claw-side stopper of a substantially planar shape provided below the sliding portion, the claw-side stopper serving to restrict a radial outward movement of the claw member by contacting with an inner surface of the corresponding rest portion, and
    the inner surface of the rest portion with which the claw-side stopper makes contact has a planar portion parallel to the claw-side stopper.

7. The motor of claim 6, wherein, slanting portions are formed on opposite circumferential sides of the claw-side stopper, the slanting portion being inclined radially inwardly as they go away circumferentially from the claw-side stopper, and
    the claw-side stopper has a circumferential width equal to or smaller than a circumferential width of the planar portion of the rest portion.

8. The motor of claim 4, wherein the inner surfaces of each of the rest portions and the connecting portions are located radially outwardly of the inner surface of the cylindrical portion.

9. A disk drive apparatus comprising:
    a motor comprising:
        a chucking device for detachably holding a disk having a central opening portion;
        a rotating body rotatable about a specified center axis, the rotating body including a rotor magnet and a rotor holder, the rotor holder having a cylindrical portion for holding the rotor magnet in place, a cover portion extending from the cylindrical portion to the center axis and a disk support portion formed on an upper surface of the cover portion for making contact with a lower surface of the disk; and
        a fixed body including a bearing member for rotatably supporting the rotating body and a stator arranged to face the rotor magnet;
    an optical pickup mechanism for optically recording and reproducing information on and from the disk;
    a moving mechanism for moving the optical pickup mechanism in a radial direction of the disk; and
    a chassis to which the motor is attached, the chassis having an opening, the optical pickup mechanism arranged inside the opening,
    wherein the chucking device includes: a center case to which the central opening portion of the disk is inserted, the center case having a cylindrical portion coaxial with the center axis and a cover portion for covering an axial upper side of the cylindrical portion of the center case, at least a part of the cylindrical portion of the center case arranged axially above the rotating body; resilient members received within the center case; and claw members for holding the disk in place, the claw members remaining in contact with radial outer ends of the respective resilient members, wherein each of the claw members has a tip end portion, a disk holding surface positioned axially below the tip end portion for holding the disk in place, and a recessed sliding portion formed substantially at a circumferential center region of the disk holding surface, the sliding portion serving to guide movement of the claw member, wherein rest portions are formed in the center case in a facing relationship with the respective sliding portions, the rest portions serving to support the respective sliding portions by contacting therewith, wherein the sliding portions are designed to make contact with the respective rest portions when the disk is mounted to the chucking device, wherein each of the sliding portions has a substantially planar slanting surface inclined radially inwardly and axially downwardly, and wherein each of the rest portions has an upwardly convex curved surface with which the corresponding sliding portion makes contact.

* * * * *